(12) United States Patent
Sarkis et al.

(10) Patent No.: US 11,391,819 B2
(45) Date of Patent: Jul. 19, 2022

(54) OBJECT VERIFICATION USING RADAR IMAGES

(71) Applicant: QUALCOMM Incorporated, San Diego, CA (US)

(72) Inventors: Michel Adib Sarkis, San Diego, CA (US); Ning Bi, San Diego, CA (US); Yingyong Qi, San Diego, CA (US); Amichai Sanderovich, Atlit (IL); Evyatar Hemo, Kiryat Bialik (IL)

(73) Assignee: QUALCOMM Incorporate, San Diego, CA (US)

( * ) Notice: Subject to any disclaimer, the term of this patent is extended or adjusted under 35 U.S.C. 154(b) by 527 days.

(21) Appl. No.: 16/272,991

(22) Filed: Feb. 11, 2019

(65) Prior Publication Data

US 2020/0025877 A1   Jan. 23, 2020

Related U.S. Application Data

(60) Provisional application No. 62/700,257, filed on Jul. 18, 2018.

(51) Int. Cl.
 *G01S 7/41* (2006.01)
 *G01S 13/89* (2006.01)
 (Continued)

(52) U.S. Cl.
 CPC .............. *G01S 7/417* (2013.01); *G01S 7/412* (2013.01); *G01S 13/89* (2013.01); *G01S 7/4972* (2013.01); *G01S 13/90* (2013.01)

(58) Field of Classification Search
 CPC ........... G06K 9/00791; G06K 9/00805; G06K 9/4604; G06K 9/6232; G06K 9/629; G06K 9/6202; G06K 9/46; G06K 9/00536; G06K 9/6267; G06T 2207/30252; G06T 2207/10016; G06T 7/73;
 (Continued)

(56) References Cited

U.S. PATENT DOCUMENTS 6,466,156 B1 * 10/2002 Ulander .............. G01S 13/9027
                                                                342/25 R
7,579,978 B1 *  8/2009 Finley ..................... G01S 7/412
                                                                  342/33

(Continued)

FOREIGN PATENT DOCUMENTS

JP         2002350529 A  * 12/2002

*Primary Examiner* — Olumide Ajibade Akonai
(74) *Attorney, Agent, or Firm* — Qualcomm Incorporate

(57) ABSTRACT

Techniques and systems are provided for performing object verification using radar images. For example, a first radar image and a second radar image are obtained, and features are extracted from the first radar image and the second radar image. A similarity is determined between an object represented by the first radar image and an object represented by the second radar image based on the features extracted from the first radar image and the features extracted from the second radar image. A determined similarity between these two sets of features is used to determine whether the object represented by the first radar image matches the object represented by the second radar image. Distances between the features in the two radar images can optionally also be compared and used to determine object similarity. The objects in the radar images may optionally be faces.

30 Claims, 18 Drawing Sheets

(51) Int. Cl.
*G01S 13/90* (2006.01)
*G01S 7/497* (2006.01)

(58) Field of Classification Search
CPC . G06T 2207/20084; G06T 2207/10044; G06T 7/246; G01S 13/904; G01S 13/90; G01S 13/74; G01S 13/87; G01S 13/878; G01S 7/417; G01S 13/89; G01S 13/931; G01S 7/412; G01S 7/4972; G01S 13/9019; G01S 13/9058; G08G 1/166
See application file for complete search history.

(56) References Cited

U.S. PATENT DOCUMENTS

| | | | |
|---|---|---|---|
| 8,686,892 B2* | 4/2014 | McCleary | G01S 13/9027 342/25 R |
| 10,254,399 B1* | 4/2019 | Simonson | G01S 7/415 |
| 10,718,863 B2* | 7/2020 | Carswell | G01S 13/4454 |
| 2005/0062639 A1* | 3/2005 | Biggs | G01S 13/89 342/194 |
| 2007/0013575 A1* | 1/2007 | Lee | G01S 7/2813 342/52 |
| 2008/0195316 A1* | 8/2008 | Krishnaswamy | G05D 1/101 701/469 |
| 2009/0316953 A1* | 12/2009 | Ezekiel | G06K 9/6215 382/103 |
| 2012/0013501 A1* | 1/2012 | Ferretti | G06T 7/11 342/25 A |
| 2014/0044362 A1* | 2/2014 | Mavromatis | G06T 7/33 382/201 |
| 2016/0054438 A1* | 2/2016 | Patole | G01S 7/35 342/127 |
| 2019/0195728 A1* | 6/2019 | Santra | G01M 5/0091 |
| 2019/0295315 A1* | 9/2019 | Levinson | G06T 5/50 |
| 2019/0303686 A1* | 10/2019 | Guo | G06K 9/3241 |

* cited by examiner

OBJECT VERIFICATION USING RADAR IMAGES

CROSS-REFERENCE TO RELATED APPLICATIONS

This application claims the benefit of U.S. Provisional Application No. 62/700,257, filed Jul. 18, 2018, which is hereby incorporated by reference, in its entirety and for all purposes.

FIELD

The present disclosure generally relates to object recognition or verification, and more specifically to techniques and systems for perform object recognition or verification using radar images.

BACKGROUND

Object recognition and/or verification can be used to identify or verify an object from a digital image or a video frame of a video clip. One example of object recognition is face recognition, where a face of a person is detected and recognized In some cases, the features of a face are extracted from an image, such as one captured by a video camera or a still image camera, and compared with features stored in a database in an attempt to recognize the face. In some cases, the extracted features are fed to a classifier and the classifier will give the identity of the input features.

Traditional object recognition techniques suffer from a few technical problems. In particular, traditional object recognition techniques are highly time intensive and resource intensive. In some cases, false positive recognitions can be produced, in which case a face or other object is incorrectly recognized as belonging to a known face or object from the database. Other times, false negatives occur, in which a face or other object in a captured image is not recognized as belonging to a known face or object from the database when it should have been recognized.

SUMMARY

Systems and techniques are described herein for performing object verification using radar images. In one illustrative example, a method of performing object verification using radar images is provided. The method includes obtaining a first radar image and a second radar image, extracting features from the first radar image, and extracting features from the second radar image. The method further includes determining a similarity between an object represented by the first radar image and an object represented by the second radar image based on the features extracted from the first radar image and the features extracted from the second radar image. The method further includes determining whether the object represented by the first radar image matches the object represented by the second radar image based on the determined similarity.

In another example, an apparatus for performing object verification using radar images is provided that includes a memory configured to store one or more radar images and a processor. The processor is configured to and can obtain a first radar image and a second radar image, extract features from the first radar image, and extract features from the second radar image. The processor is further configured to and can determine a similarity between an object represented by the first radar image and an object represented by the second radar image based on the features extracted from the first radar image and the features extracted from the second radar image. The processor is further configured to and can determine whether the object represented by the first radar image matches the object represented by the second radar image based on the determined similarity.

In another example, a non-transitory computer-readable medium is provided that has stored thereon instructions that, when executed by one or more processors, cause the one or more processor to: obtaining a first radar image and a second radar image; extracting features from the first radar image; extracting features from the second radar image; determining a similarity between an object represented by the first radar image and an object represented by the second radar image based on the features extracted from the first radar image and the features extracted from the second radar image; and determining whether the object represented by the first radar image matches the object represented by the second radar image based on the determined similarity.

In another example, an apparatus for performing object verification using radar images is provided. The apparatus includes means for obtaining a first radar image and a second radar image, means for extracting features from the first radar image, and means for extracting features from the second radar image. The apparatus further includes means for determining a similarity between an object represented by the first radar image and an object represented by the second radar image based on the features extracted from the first radar image and the features extracted from the second radar image. The apparatus further includes means for determining whether the object represented by the first radar image matches the object represented by the second radar image based on the determined similarity.

In some aspects, the method, apparatuses, and computer-readable medium described above further comprise: determining a distance between the features from the first radar image and the features from the second radar image; and determining the similarity between the object represented by the first radar image and the object represented by the second radar image based on the determined distance.

In some aspects, the first radar image and the second radar image are generated using signals from an array of antennas. In some examples, each pixel in the first radar image corresponds to an antenna from the array of antennas, and wherein each pixel in the second radar image corresponds to an antenna from the array of antennas.

In some aspects, the features extracted from the first radar image include at least an amplitude and a phase for each pixel in the first radar image, and wherein the features extracted from the second radar image include at least an amplitude and a phase for each pixel in the second radar image.

In some aspects, determining the distance between the features from the first radar image and the features from the second radar image includes: determining a distance between the amplitude for each pixel in the first radar image and the amplitude for each pixel in the second radar image; and determining a distance between the phase for each pixel in the first radar image and the phase for each pixel in the second radar image.

In some aspects, the features extracted from the first radar image further include at least a magnitude for each pixel in the first radar image, the magnitude including a magnitude of the amplitude and phase of each pixel in the first radar image. In such aspects, the features extracted from the second radar image further include at least a magnitude for each pixel in the second radar image, where the magnitude for each pixel in the second radar image includes a magnitude of the amplitude and phase of each pixel in the first radar image.

In some aspects, determining the distance between the features from the first radar image and the features from the second radar image further includes determining a distance between the magnitude for each pixel in the first radar image and the magnitude for each pixel in the second radar image.

In some aspects, at least an amplitude and a phase are extracted for each range bin of a plurality of range bins corresponding to each pixel in the first radar image. In such aspects, at least an amplitude and a phase are extracted for each range bin of a plurality of range bins corresponding to each pixel in the second radar image. In some examples, a magnitude is extracted for each range bin of the plurality of range bins corresponding to each pixel in the first radar image, and a magnitude is extracted for each range bin of the plurality of range bins corresponding to each pixel in the second radar image.

In some aspects, the similarity between the object represented by the first radar image and the object represented by the second radar image is determined using a mapping function between matching labels and distances between radar image features. In some examples, the mapping function is determined using a support vector machine (SVM). In some examples, the mapping function is determined using a support vector machine (SVM) and principal component analysis (PCA). In some examples, the mapping function is determined using a Partial Least Squares Regression (PLSR). In some examples, the mapping function is determined using a deep neural network.

In some aspects, the object represented by the first radar image is determined to match the object represented by the second radar image when the determined similarity is greater than a matching threshold. In some aspects, the object represented by the first radar image is determined not to match the object represented by the second radar image when the determined similarity is less than a matching threshold.

In some aspects, the first radar image is an input image and wherein the second radar image is an enrolled image from an enrolled database.

In some aspects, the object represented by the first radar image is a first face, and the object represented by the second radar image is a second face. The first face and the second face can be the same face belonging to the same person, or can be different faces. If the first face and the second face are the same face, then a match will likely be determined. If the first face and the second face are not the same face, then a match will likely not be determined.

In some aspects, the radar data can be combined RGB images, depth images, or other data to improve accuracy of the object verification. For example, 60 gigahertz (GHz) radar images and RGB images of one or more objects can be processed in combination to perform object verification.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
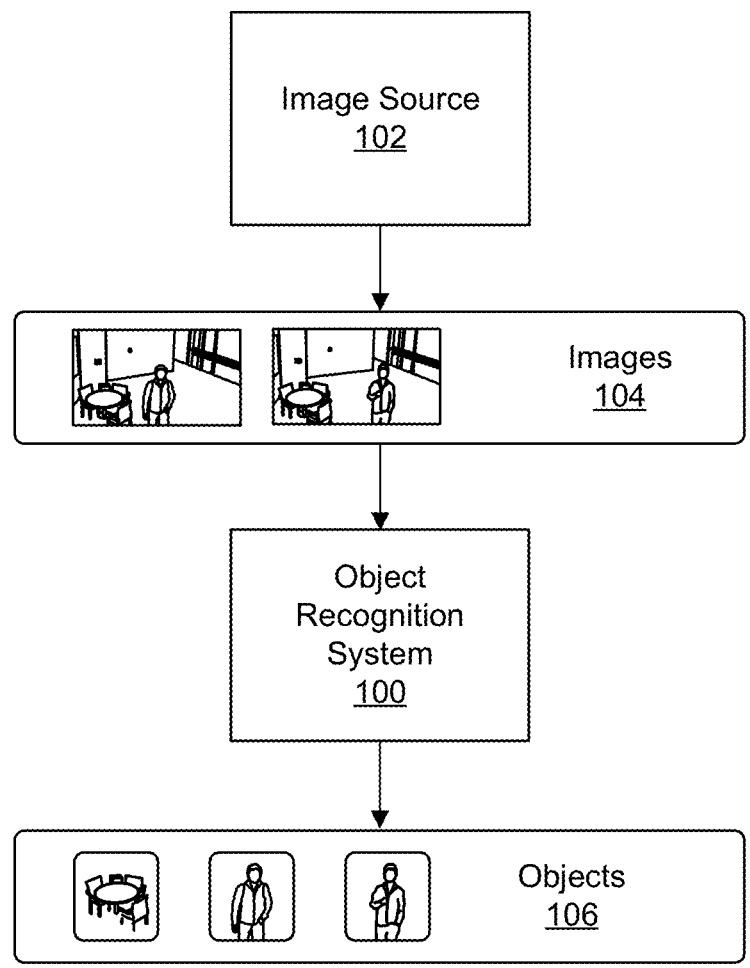
FIG. 1 is a block diagram illustrating an example of system for recognizing objects in one or more video frames, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Object recognition or verification systems can recognize or verify objects in one or more images or in one or more video frames that capture images of a scene. Different types of object recognition/verification systems are available for recognizing and/or verifying objects in images. Details of an example object recognition system are described below with respect to FIG. 1 and FIG. 2. One example of an object that will be used herein for illustrative purposes is a face. However, one of ordinary skill will appreciate that the techniques described herein can be applied to any object captured in an image or video frame, such as a person (the person as a whole, as opposed to just a face), a vehicle, an airplane, an unmanned aerial vehicle (UAV) or drone, or any other object.

Techniques and systems are provided for performing object verification using radar images. For example, a first radar image and a second radar image are obtained, and features are extracted from the first radar image and the second radar image. A similarity is determined between an object represented by the first radar image and an object represented by the second radar image based on the features extracted from the first radar image and the features extracted from the second radar image. It can be determined whether the object represented by the first radar image matches the object represented by the second radar image based on the determined similarity. In some cases, a distance between the features from the first radar image and the features from the second radar image can be determined. The similarity between the object represented by the first radar image and the object represented by the second radar image can then be determined based on the determined distance. One or both of the objects in the two radar images are optionally faces. Further details of the object verification techniques and systems are described below.

FIG. 1 is a block diagram illustrating an example of a system for recognizing objects in one or more video frames. The object recognition system 100 receives images 104 from an image source 102. The images 104 can include still images or video frames, which can also be referred to herein as video pictures or pictures. The images 104 each contain images of a scene. Two example images are illustrated in the "images 104" box of FIG. 1, each illustrating a room with a table and chairs, one with a person in a first position and first pose, the other with a person in a second position and second pose. When video frames are captured, the video frames can be part of one or more video sequences. The image source 102 can include an image or video capture device (e.g., a camera, a camera phone, a video phone, an ultrasonic imager, a RADAR, LIDAR, or SONAR device, or other suitable capture device), an image storage device, an image archive containing stored images, an image server or content provider providing image data, a video feed interface receiving video from a video server or content provider, a computer graphics system for generating computer graphics image data, a combination of such sources, or other source of image content.

The images 104 may be raster images composed of pixels (or voxels) optionally with a depth map, vector images composed of vectors or polygons, or a combination thereof. The images 104 may include one or more two-dimensional representations of an object (such as a face or other object)

along one or more planes or one or more three dimensional representations of the object (such as a face or other object) within a volume. Where the image is three-dimensional, the image may be generated based on distance data (e.g., gathered using RADAR, LIDAR, SONAR, and/or other distance data), generated using multiple two-dimensional images from different angles and/or locations, or some combination thereof. Where the image is three-dimensional, the image may include only wireframe, voxel, and/or distance data, or may include such data that is also textured with visual data as well. Any visual data may be monochrome, greyscale (e.g., only luminosity data without color), partial-color, or full-color. The image may have other data associated with RADAR, LIDAR, or SONAR recording, such as amplitude, phase, and magnitude as discussed further herein.

The object recognition system 100 can process the images 104 to detect and/or track objects 106 in the images 104. In some cases, the objects 106 can also be recognized by comparing features of the detected and/or tracked objects with enrolled objects that are registered with the object recognition system 100. The object recognition system 100 outputs objects 106 as detected and tracked objects and/or as recognized objects. Three example objects 106 are illustrated in the "objects 106" box of FIG. 1, respectively illustrating the table and chairs recognized from both example images of the images 104, the person in the first position and first pose recognized from the first example image of the images 104, and the person in the second position and second pose recognized from the second example image of the images 104.

Any type of object recognition can be performed by the object recognition system 100. An example of object recognition includes face recognition, where faces of people in a scene captured by images are analyzed and detected and/or recognized. An example face recognition process identifies and/or verifies an identity of a person from a digital image or a video frame of a video clip. In some cases, the features of the face are extracted from the image and compared with features of known faces stored in a database (e.g., an enrolled database). In some cases, the extracted features are fed to a classifier and the classifier can give the identity of the input features. Face detection is a kind of object detection in which the only object to be detected is a face. While techniques are described herein using face recognition as an illustrative example of object recognition, one of ordinary skill will appreciate that the same techniques can apply to recognition of other types of objects.

The object recognition system 100 can perform object identification and/or object verification. Face identification and verification is one example of object identification and verification. For example, face identification is the process to identify which person identifier a detected and/or tracked face should be associated with, and face verification is the process to verify if the face belongs to the person to which the face is claimed to belong. The same idea also applies to objects in general, where object identification identifies which object identifier a detected and/or tracked object should be associated with, and object verification verifies if the detected/tracked object actually belongs to the object with which the object identifier is assigned. Objects can be enrolled or registered in an enrolled database that contains known objects. For example, an owner of a camera containing the object recognition system 100 can register the owner's face and faces of other trusted users, which can then be recognized by comparing later-captured images to those enrolled images. The enrolled database can be located in the same device as the object recognition system 100, or can be located remotely (e.g., at a remote server that is in communication with the system 100). The database can be used as a reference point for performing object identification and/or object verification. In one illustrative example, object identification and/or verification can be used to authenticate a user to the camera to log in and/or unlock certain functionality in the camera or a device associated with the camera, and/or to indicate an intruder or stranger has entered a scene monitored by the camera.

Object identification and object verification present two related problems and have subtle differences. Object identification can be defined as a one-to-multiple problem in some cases. For example, face identification (as an example of object identification) can be used to find a person from multiple persons. Face identification has many applications, such as for performing a criminal search. Object verification can be defined as a one-to-one problem. For example, face verification (as an example of object verification) can be used to check if a person is who they claim to be (e.g., to check if the person claimed is the person in an enrolled database). Face verification has many applications, such as for performing access control to a device, system, or other accessible item.

Using face identification as an illustrative example of object identification, an enrolled database containing the features of enrolled faces can be used for comparison with the features of one or more given query face images (e.g., from input images or frames). The enrolled faces can include faces registered with the system and stored in the enrolled database, which contains known faces. A most similar enrolled face can be determined to be a match with a query face image. The person identifier of the matched enrolled face (the most similar face) is identified as belonging to the person to be recognized. In some implementations, similarity between features of an enrolled face and features of a query face can be measured with a distance calculation identifying how different (or "far apart") these values are, optionally in multiple dimensions. Any suitable distance can be used, including Cosine distance, Euclidean distance, Manhattan distance, Minkowski distance, Mahalanobis distance, or other suitable distance. One method to measure similarity is to use matching scores. A matching score represents the similarity between features, where a very high score (e.g., exceeding a particular matching score threshold) between two feature vectors indicates that the two feature vectors are very similar. In contrast, a low matching score (e.g., below the matching score threshold) between two feature vectors indicates that the two feature vectors are dissimilar. A feature vector for a face can be generated using feature extraction. In one illustrative example, a similarity between two faces (represented by a face patch) can be computed as the sum of similarities of the two face patches. The sum of similarities can be based on a Sum of Absolute Differences (SAD) between the probe patch feature (in an input image) and the gallery patch feature (stored in the database). In some cases, the distance is normalized to 0 and 1. As one example, the matching score can be defined as 1000*(1−distance).

In some cases, the matching score threshold may be computed by identifying an average matching score in images previously known to depict the same object/face. This matching score threshold may optionally be increased (to be stricter and decrease false positives) or decreased (to be less strict and decrease false negatives or rejection rate) by a static amount, multiplier and/or percentage, or a multiple of the standard deviation corresponding to that average.

Another illustrative method for face identification includes applying classification methods, such as a support vector machine (SVM) to train a classifier that can classify different faces using given enrolled face images and other training face images. For example, the query face features can be fed into the classifier and the output of the classifier will be the person identifier of the face.

For face verification, a provided face image will be compared with the enrolled faces. This can be done with simple metric distance comparison or classifier trained with enrolled faces of the person. In general, face verification needs higher recognition accuracy since it is often related to access control, such as for entry to buildings or logging in to computing devices. A false positive is not expected in this case. For face verification, a purpose is to recognize who the person is with high accuracy but with low rejection rate. Rejection rate is the percentage of faces that are not recognized due to the matching score or classification result being below the threshold for recognition.

Figure 2:
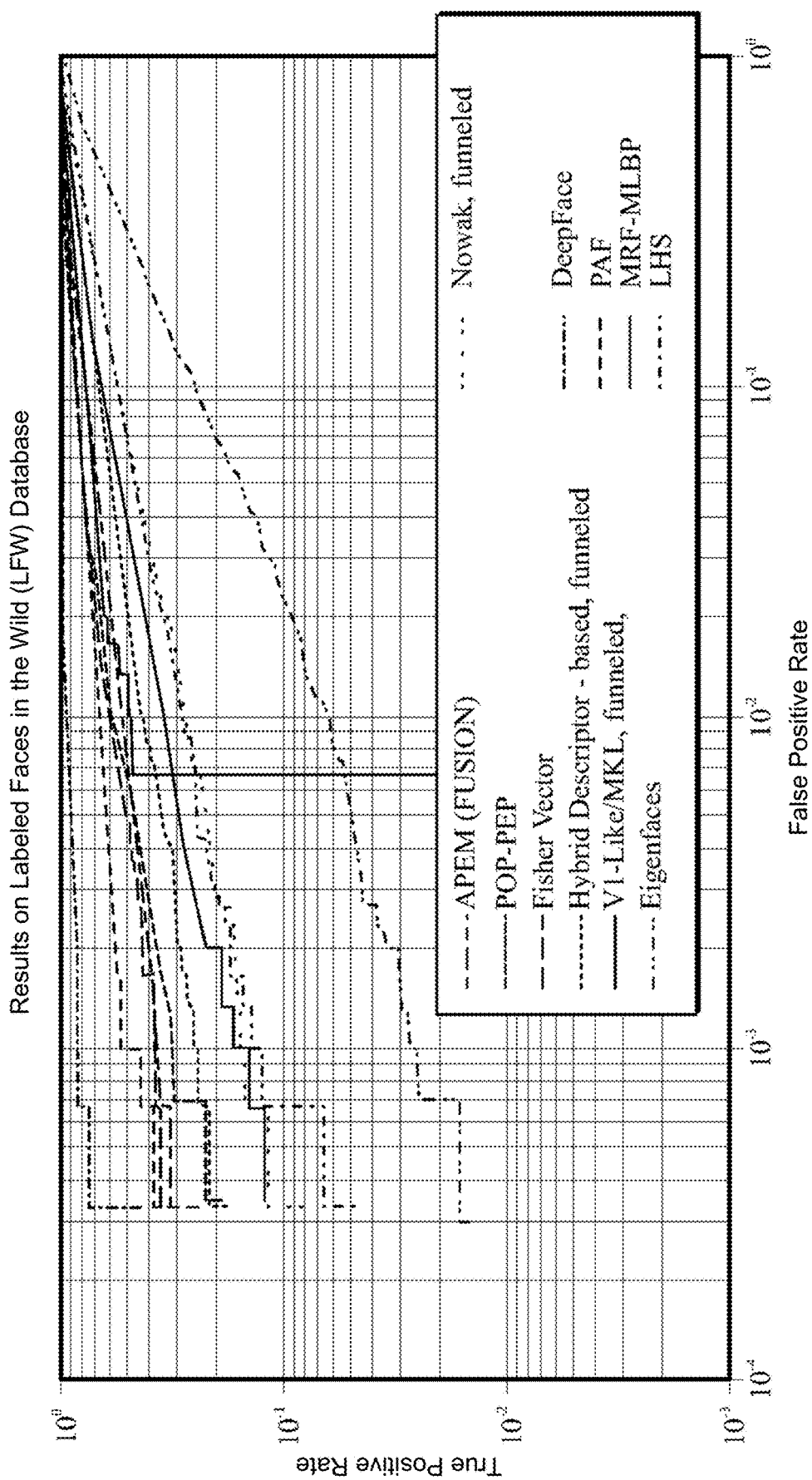
FIG. 2 is a graph illustrating results of different face verification methods performed on a labeled faces in the wild (LFW) database, in accordance with some examples.

Metrics can be defined for measuring the performance of object recognition results. For example, in order to measure the performance of face recognition algorithms, it is necessary certain metrics can be defined. Face recognition can be considered as a kind of classification problem. True positive rate and false positive rate can be used to measure the performance. One example is a receiver operating characteristic (ROC). The ROC curve is created by plotting the true positive rate (TPR) against the false positive rate (FPR) at various threshold settings. In a face recognition scenario, true positive rate is defined as the percentage that a person is correctly identified as himself/herself and false positive rate is defined as the percentage that a person is wrongly classified as another person. Examples of ROC curves are illustrated in FIG. 2. However, both face identification and verification may use a confidence threshold to determine if the recognition result is valid. In some cases, all faces that are determined to be similar to and thus match one or more enrolled faces are given a confidence score. Determined matches with confidence scores that are less than a confidence threshold will be rejected. In some cases, the percentage calculation will not consider the number of faces that are rejected to be recognized due to low confidence. In such cases, a rejection rate should also be considered as another metric, in addition to true positive and false positive rates.

With respect to rejection rates, true negative rates (TNR) and false negative rates (FNR) can similarly be used to measure the performance of classification. In a face recognition scenario, false negative rate is defined as the percentage that a person incorrectly fails to be identified in an image in which the person is represented, while true negative rate is defined as the percentage that the classifier correctly identifies that a person is not represented in an image.

If the false positive rate (FPR) exceeds a pre-determined threshold, then in some cases classification constraints may be "tightened" or "narrowed" or "made stricter" or "made more rigorous" so that it is more difficult to achieve a positive recognition, so as to reduce or eliminate unexpected recognition of the object/face. This may be achieved by increasing the matching score threshold and/or reducing confidence scores for positives and/or increasing confidence scores for negatives, for example by a static amount or using a multiplier/percentage. If the false negative rate (FNR) exceeds a pre-determined threshold, then in some cases classification constraints may be "loosened" or "relaxed" or "made easier" or "made more flexible" or "made more lax" so that it is easier to achieve a positive recognition, so as to reduce or eliminate unexpected failures to recognize of the object/face. This may be achieved by decreasing the matching score threshold and/or increasing confidence scores for positives and/or decreasing confidence scores for negatives, for example by a static amount or using a multiplier/percentage.

Figure 3:
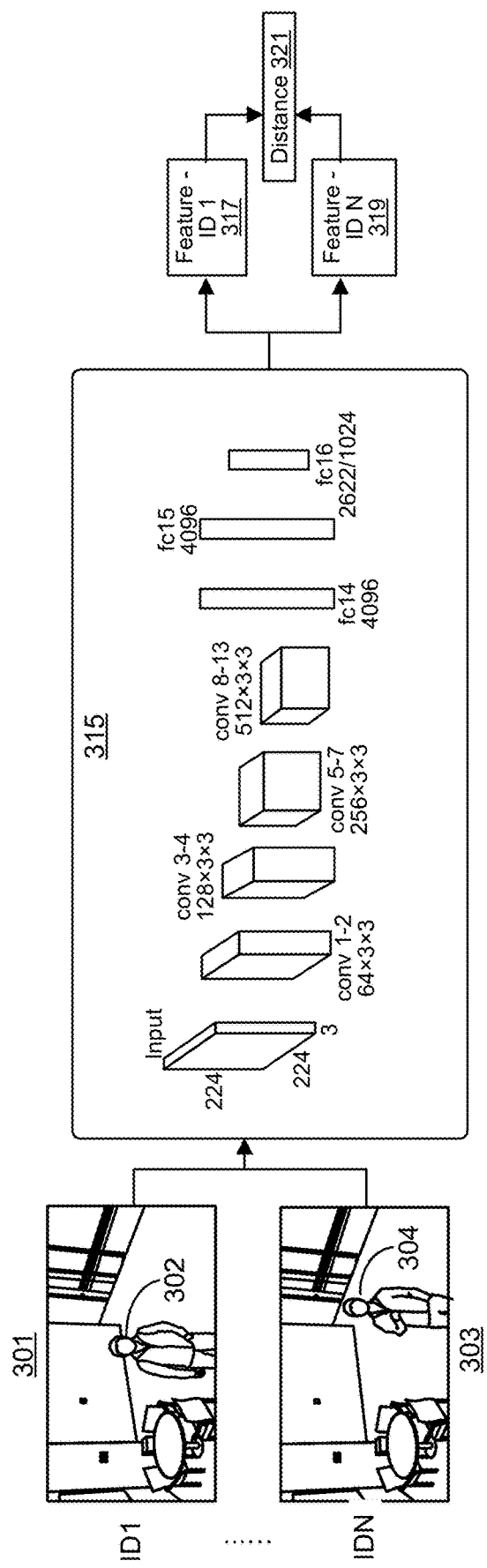
FIG. 3 is a diagram illustrating an example of a neural network used to perform face recognition between two images, in accordance with some examples.

Specific examples of face recognition techniques include Hierarchical Probabilistic Elastic Part (PEP) or Fischer Vectors, which both give good results. In some cases, a deep learning neural network based face recognition/verification system can be used. FIG. 3 is a diagram illustrating an example of a visual geometry group (VGG) neural network that can be used for face authentication to determine whether the person 302 in the image 301 is the same as the person 304 in the image 303. The general idea for neural network based face recognition is that, given two RGB or monochrome images or given two depth images, it can be determined whether the two images are for the same person or not. For each person, several images are input to the neural network, each with a certain person ID. The network is trained with images of various persons, and hence their IDs, in order to extract some features. The features can be detected over a number of convolutions 315, with the output of convolutions passed through an activation function such as a rectified linear unit (ReLU) function. The features can be stored and used for comparison with features extracted from input images of a user during runtime, such as when the user is attempting to be authenticated by a device or system. In FIG. 3, a first feature 317 is extracted corresponding to the first image 301, and an Nth feature 319 is extracted corresponding to the Nth image 303. A distance 321 between the features (e.g., a cosine distance or other suitable distance metric) is computed during runtime for authentication. If the images 301 and 303 are radar images as discussed further herein, the features 317 and 319 may be associated with an amplitude, phase, and/or magnitude, and the distance may represent a different in the corresponding amplitudes, phases, and/or magnitudes of the features.

In some cases, traditional face verification techniques (e.g., Hierarchical Probabilistic Elastic Part (PEP), Fischer Vectors, or the like) can be boosted using deep learning (DL). FIG. 2 is a graph illustrating results of different face verification methods performed on a labeled faces in the wild (LFW) database. Deep learning based systems provide high true positive rates. However, deep learning based solutions require huge chunks of data for training (e.g., hundreds of thousands and even millions of images).

The graph of FIG. 2 in particular charts receiver operating characteristic curves (ROC curves) plotting the true positive rate (TPR) against the false positive rate (FPR) at various threshold settings for a number of facial and object recognition methods. The methods in the graph of FIG. 2 include: adaptive probabilistic elastic matching (APEM) (with joint Bayesian adaptation and/or multiple features fusion), parts-of-parts probabilistic elastic part (POP-PEP), Fisher Vector (FV), hybrid descriptor (based, funneled), V1-like multi kernel learning (MKL) (funneled), "eigenfaces" (eigenvectors applied to facial recognition), Nowak recognition (funneled), DeepFace, Pose Adaptive Filter (PAF), Markov random field multi-scale local binary pattern (MRF-MLBP), and local higher-order statistics (LHS). Other techniques that may be used include Hierarchical probabilistic elastic part (Hierarchical-PEP). APEM and other techniques may be enhanced with joint Bayesian adaptation. Fisher vector is a specialized form of Fisher kernel—other forms of Fisher kernel can be used. Markov random field (MRF) may be used in other contexts as well.

The techniques described above can be referred to as transfer learning, which refers to the technique of using knowledge of one domain to another domain (e.g., a neural network model trained on one dataset can be used for another dataset by fine-tuning the former network). For example, given a source domain Ds and a learning task Ts, a target domain Dt and learning task Tt, transfer learning can improve the learning of the target predictive function Ft(•) in Dt using the knowledge in Ds and Ts, where Ds≠Dt, or Ts≠Tt.

Figure 4A:
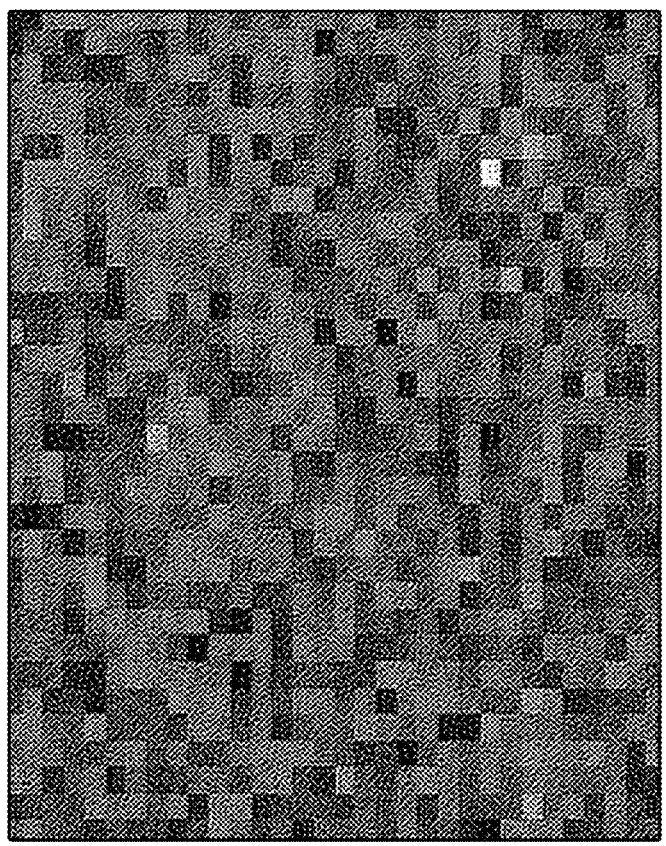
FIG. 4A is a 60 gigahertz (GHz) radar image of a first subject, in accordance with some embodiments.
Figure 4B:
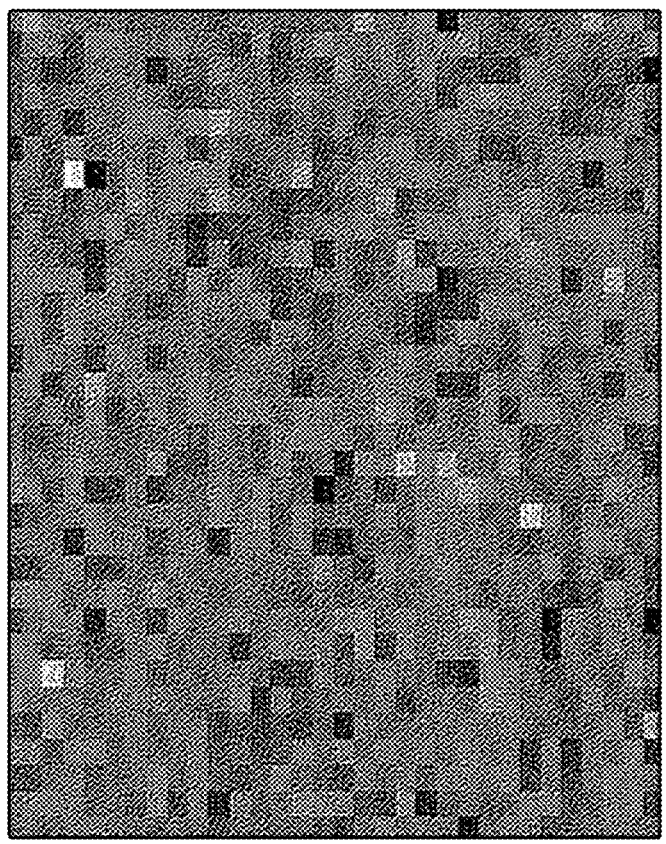
FIG. 4B is a 60 gigahertz (GHz) radar image of a second subject, in accordance with some embodiments.

The transfer learning techniques described above can theoretically be applied to radar image data. FIG. 4A is an example of a 60 gigahertz (GHz) radar image of a first subject, and FIG. 4B is an example of a 60 gigahertz (GHz) radar image of a second subject. However, use of transfer learning techniques with such radar images would require an incredibly large amount of data and therefore computing time and computing resources. Furthermore, radar image data (e.g., 60 GHz radar images or other radar images) are not very common at the moment, and thus the amount of training and enrollment data is scarce. The image structure of radar images is also different from red-green-blue (RGB) or YCbCr images, in which case transfer learning might not work as expected.

Systems and methods are described herein for performing object verification using radar images. The systems and methods can also be used to perform object recognition. Instead of learning various IDs (e.g., person IDs), a similarity is learned based on a distance between two radar images. For example, features can be extracted from two radar images, and a distance (e.g., absolute difference, Hadamard product, polynomial maps, element-wise multiplication, or other suitable distance) can be determined between the extracted features from the two radar images. A mapping function (also referred to as a similarity function) can then be learned that maps matching labels to the distances. The matching labels can include a binary classification, including a label for a match (e.g., "true" or 1) and a label for a non-match (e.g., "false" or 0). An advantage of the techniques described herein is that the problem is transformed to a binary classification problem—the objects in the two radar images match and the object is thus verified and/or authenticated, or the objects in the two radar images do not match and the object is not verified and/or authenticated. Such techniques simplify the complex problem of object recognition and therefore expand the capabilities and applicability of radar images in the image recognition space, allowing computers to recognize, verify, and/or authenticate objects in radar images. Training a neural network and applying learning to reduce object recognition and verification to a binary classification improves classification speed, quality, and ease of use, and reduces computational time and resources, ultimately producing an improvement in the functioning of the computer itself.

Figure 5:
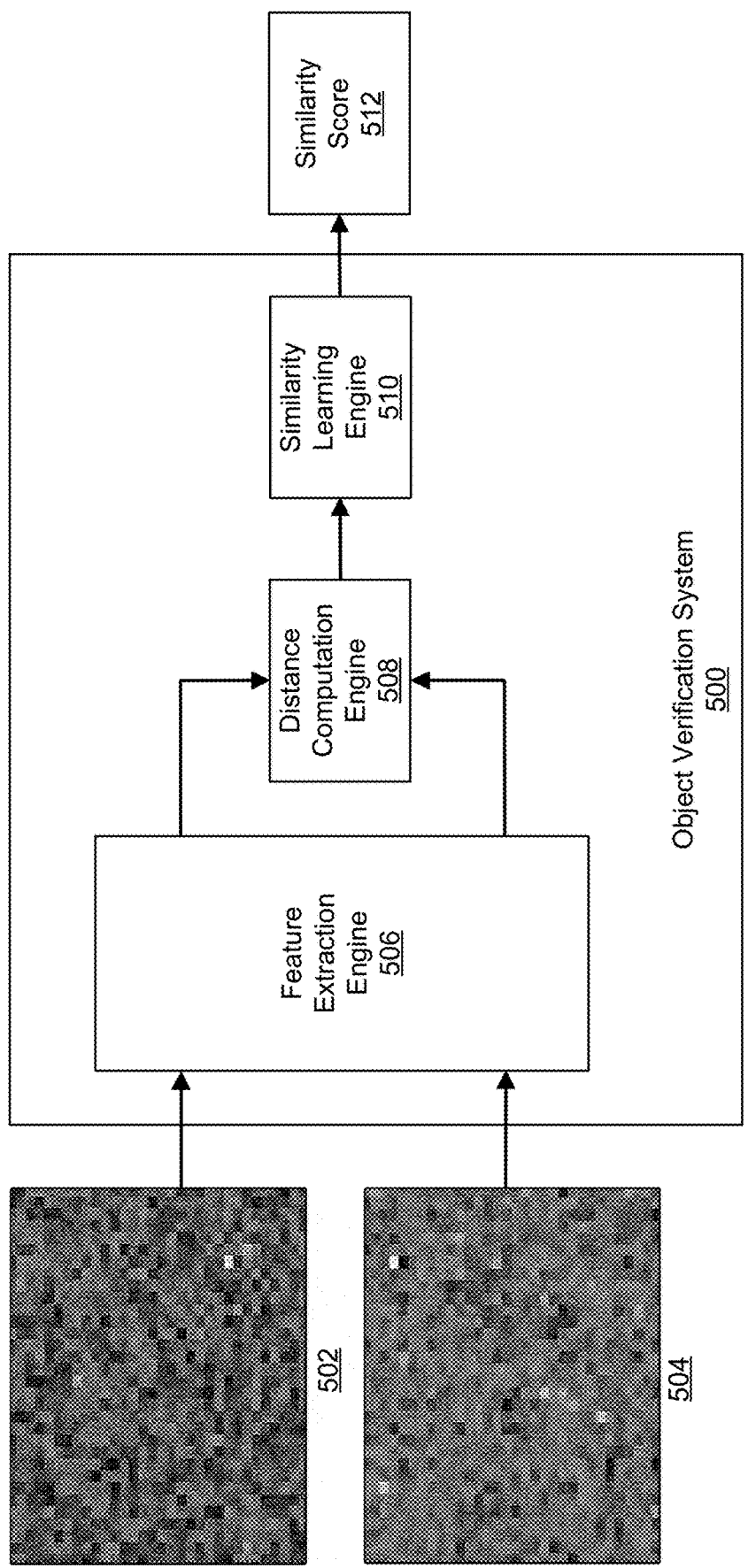
FIG. 5 is a diagram illustrating a system for performing object verification (or authentication) using radar images, in accordance with some embodiments.

FIG. 5 is a diagram illustrating an example of an object verification system 500 that uses Radio Detection And Ranging (radar) images for performing object verification. The object verification system 500 can be included in a computing device (e.g., the computing device 1310 of FIG. 13A, the computing system 1700 of FIG. 17, or other suitable computing device) and has various components, including a feature extraction engine 506, a distance computation engine 508, and a similarity learning engine 510. As described in more detail below, the feature extraction engine 506 can extract features from the radar images 502 and 504 (e.g., 60 GHz images) for face verification/authentication, the distance computation engine 508 can compute a distance between two objects (e.g., faces) represented in the radar images, and the similarity learning engine 510 can learn similarities (between feature distances and the matching labels) to enable face verification using the radar images. The output from the similarity learning engine 510 includes a similarity score 512, indicating a similarity between two objects represented in the images 502 and 504. The image 502 can include an input image received at runtime from a capture device, for example an image of a user's face when the user is attempting to be authenticated by the computing device, and the image 504 can include an enrolled image from an enrolled database of known objects, for example a database of faces of known users.

Figure 15:
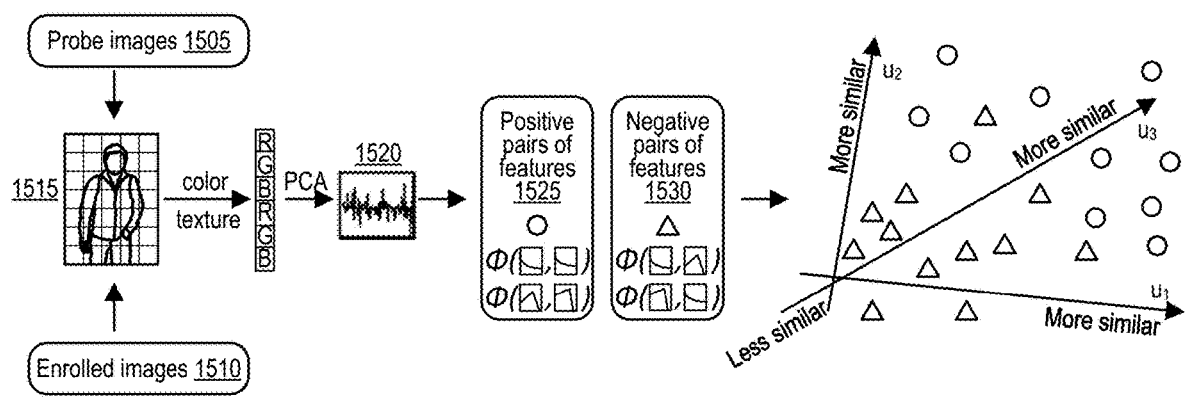
FIG. 15 illustrates feature extraction, mapping, and training of a mixture of similarity functions to discover matching features or patterns.

The components of the object verification system 500 can include electronic circuits or other electronic hardware (e.g., any hardware illustrated in or discussed with respect to FIG. 15), which can include one or more programmable electronic circuits (e.g., microprocessors, graphics processing units (GPUs), digital signal processors (DSPs), central processing units (CPUs), or other suitable electronic circuits), computer software, firmware, or any combination thereof, to perform the various operations described herein. While the object verification system 500 is shown to include certain components, one of ordinary skill will appreciate that the object verification system 500 can include more or fewer components than those shown in FIG. 5. For example, the object verification system 500 may also include, in some instances, one or more memory (e.g., RAM, ROM, cache, buffer, and/or the like) and/or processing devices that are not shown in FIG. 5.

Figure 13A:
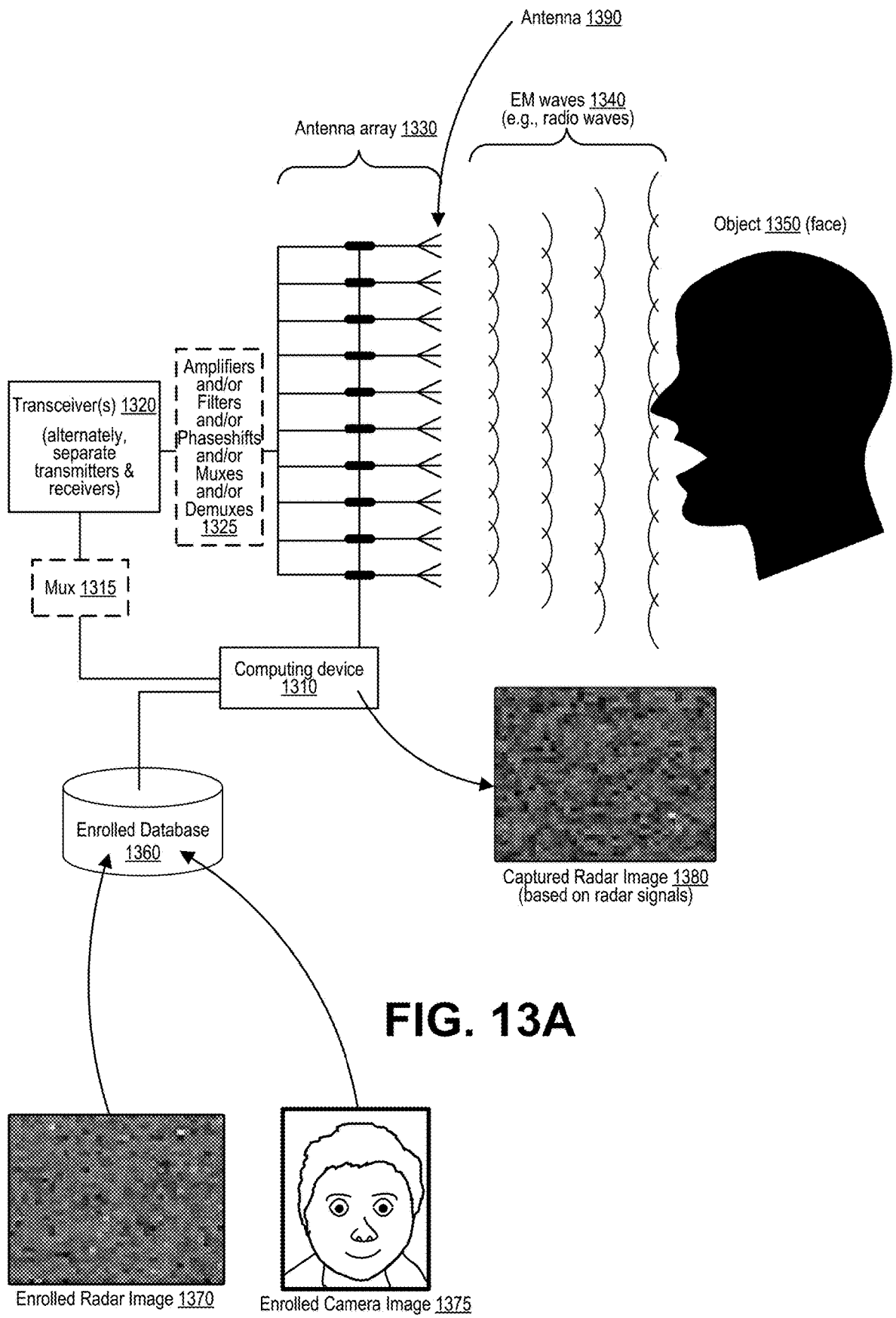
FIG. 13A is an antenna array system architecture that can be used to capture the radar images, in accordance with some examples.
Figure 13B:
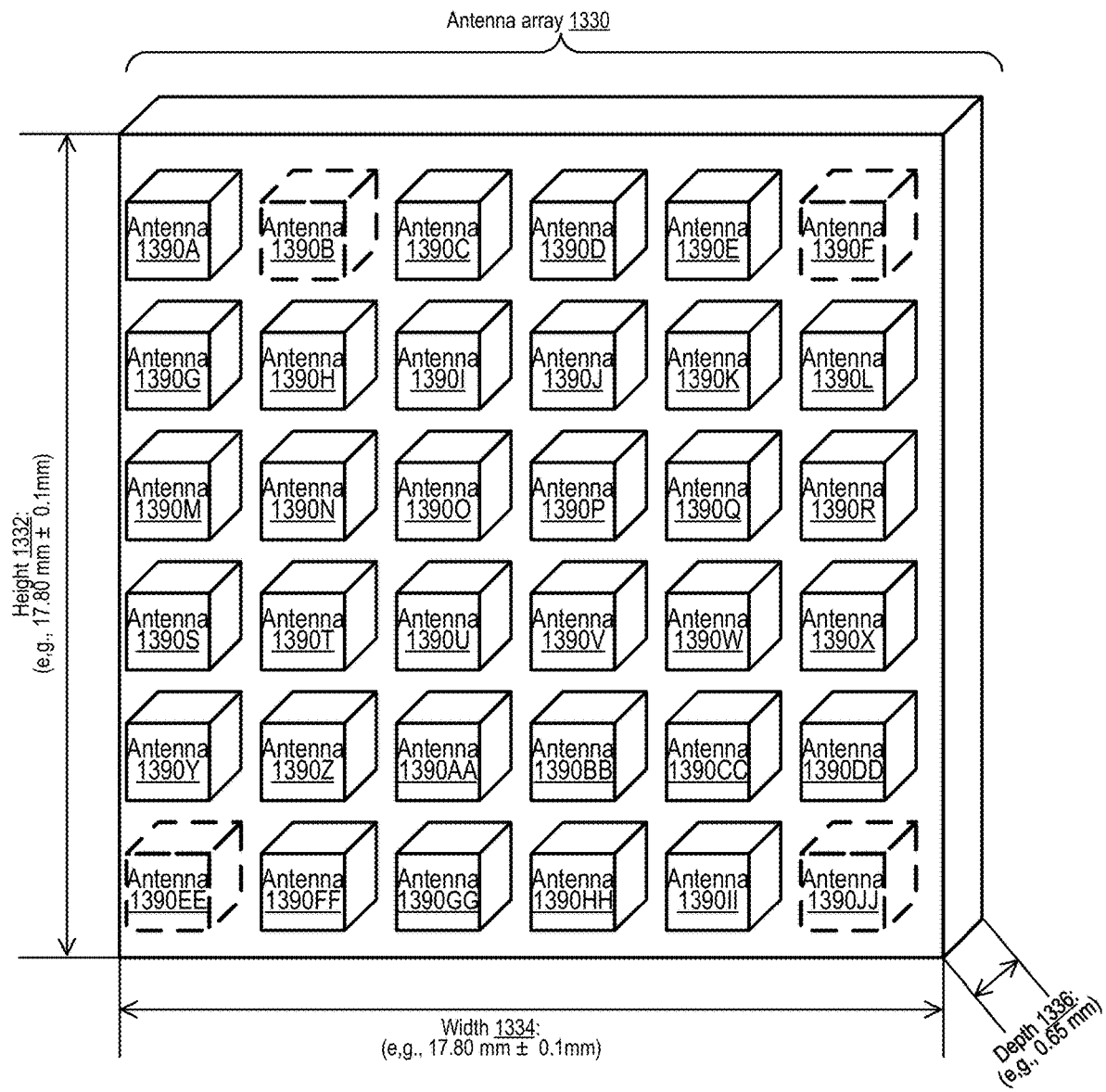
FIG. 13B is an example of an antenna array that can be used to capture the radar images, in accordance with some examples.

The object verification system 500 can receive radar images generated by a radar system (not shown in FIG. 5) such as the radar system shown in FIG. 13A and FIG. 13B. The radar images can have any suitable frequency, such as frequencies in the millimeter bands or microwave bands. Illustrative examples of radar images that can be used for object verification include 10 GHz images, 30 GHz images, 60 GHz images, 100 GHz images, 300 GHz images, or images having any other suitable high frequency. Radar images may be millimeter wave radar images, defined as radar images having short wavelengths that range from a first wavelength size (e.g., 1 millimeter) to a second wavelength size (e.g., 10 millimeters) and/or falling into a band or range of spectrum between a first frequency (e.g., 30 Ghz) and a second frequency (e.g., 300 Ghz). Millimeter wave radar images are sometimes referred to as millimeter band, extremely high frequency (EHF), or very high frequency (VHF). Other radio frequencies and wavelengths outside of the millimeter band may alternately or additionally be used, such as bands in the microwave region between 300 megahertz (MHz) and 30 GHz. In some cases, the radar images can be received directly from the radar system. In some cases, the radar images can be retrieved from a storage device or a memory included in the computing device, or from a storage device or a memory that is external to the computing device. The radar system can be part of the object verification system 500, or can be separate from the object verification system 500.

The radar system can include an array of antennas (e.g., such as the array 1330 illustrated in FIG. 13A and FIG. 13B), with each antenna including or being coupled with a receiver. In some implementations, the radar system can have a single transmitter that transmits a radio frequency (RF) signal that reflects off of one or more objects (e.g., a face) in the environment. In such implementations, the antennas and receivers of the array of antennas receive the reflected RF signals originating from the transmitter, with each antenna and receiver receiving a different version of the reflected signals and recording data such as amplitude and phase of the received reflected signals. In other implementations, each antenna of the antenna array can include or be coupled with a transmitter, in which case a receiver-transmitter pair is provided for each antenna in the array. For a given receiver-transmitter pair, the transmitter can transmit an RF signal that reflects off of one or more objects (e.g., a face) in the environment, and the receiver can receive the reflected RF signal.

In some examples, the radar system can be implemented as one or more multi-gigabit radios on the computing device. For example, multi-gigabit technologies (e.g., multi-gigabit WLAN technologies) using high frequency bands (e.g., 10 GHz, 30 GHz, 60 GHz, 100 GHz images, 300 GHz, or other suitable high frequency) are implemented for wireless communications in many computing devices (e.g., mobile devices). Multi-gigabit radios in mobile devices can be operated in a radar mode for capturing a transmitted signal reflected by nearby objects. In some implementations, the one or more multi-gigabit radios of the computing device can be used for generating the radar images. In one illustrative example, the one or more multi-gigabit radios can include one or more 60 GHz WLAN radios. In such examples, a multi-gigabit radio can include the array of antennas (along with the receivers and the transmitter, or the receiver-transmitter pairs).

Each pixel of a radar image corresponds to an antenna (and receiver or receiver-transmitter pair) from the array of antennas. In one illustrative example, the array of antennas can include an array of 32×32 antennas, in which case the radar system includes a total of 1024 antennas. An image generated by such a radar system will include a two-dimensional array of 32×32 pixels, with each pixel corresponding to an antenna, producing an image with a total of 1024 pixels. Thus, the width and height of the image—and the number of pixels or voxels along is each side—is a function of the number of antennas in the array. At least as discussed here, the term "antenna" should be understood to represent either just an antenna (for at least one receiver, transmitter, transceiver, or a combination thereof corresponding included in or coupled to the array), or can represent an entire receiver, transmitter, or transceiver. In this way, the array of antennas may be an array of receivers, transmitters, transceivers, or a combination thereof.

In some cases, the antennas (and receivers) from the array of antennas of the radar system can sort signals into different range bins n, which correspond to different distance ranges. For example, each antenna (and receiver) can sort the received RF signal returns into a set of bins n by time of arrival relative to the transmit pulse. The time interval is in proportion to the round-trip distance to the object(s) reflecting the RF waves. By checking the receive signal strength in the bins, the antennas (and receivers) can sort the return signals across the different bins n (the bins corresponding to different ranges). This can be performed while scanning across desired azimuths and elevations. Having many range bins allows more precise range determinations. A short duration pulse can be detected and mapped into a small number of range bins (e.g., only one or two range bins), whereas a longer pulse duration, width, and/or transmission power allows for a greater amount of signal energy to be transmitted and a longer time for the receiver to integrate the energy, resulting in a longer detection range. When the received signals are sorted into range bins, a radar image can be generated for each range bin n.

The feature extraction engine 506 can extract features from the radar images (e.g., 60 GHz images) for face verification. For example, the feature extraction engine 506 can extract features from the first radar image 502, and can extract features from the second radar image 504. In some examples, the features extracted from a radar image can include an amplitude (A) and a phase ($\Phi$) for each pixel (corresponding to the amplitude and phase of an RF signal received by one of the antennas-receivers in the antenna array). In such examples, an (Amplitude (A)/Phase ($\Phi$)) is used to represent each pixel. The amplitude (A) of an RF signal received by a radar antenna includes the height (or maximum displacement from the x-axis) of the waveform of the signal. The amplitude (A) can be defined as the distance between the midline of the RF signal waveform and its crest or trough. The phase ($\Phi$) of an RF signal is the position of the waveform relative to time zero. For example, assuming a RF signal waveform has peaks and valleys with a zero-crossing (crossing an x-axis) between the peaks and valleys, the phase ($\Phi$) of the RF signal is the distance between the first zero-crossing and the point in space defined as the origin. Two waves with the same frequency are considered to be in phase if they have the same phase, while waves with the same frequency but different phases are out of phase. In combination with the range bin sorting, the differences in amplitude (A) and phase ($\Phi$) of the received radar signal at each antenna help characterize the surface of the object that reflects the RF waves.

In some examples, the features extracted from a radar image can include an amplitude (A), a phase ($\Phi$), and a magnitude (M) for each pixel. The magnitude of an RF signal from a radar antenna includes the absolute value of the amplitude and phase of the RF signal. In such examples, an (Amplitude (A)/Phase ($\Phi$)/Magnitude (M)) is used to represent each pixel.

Figure 6:
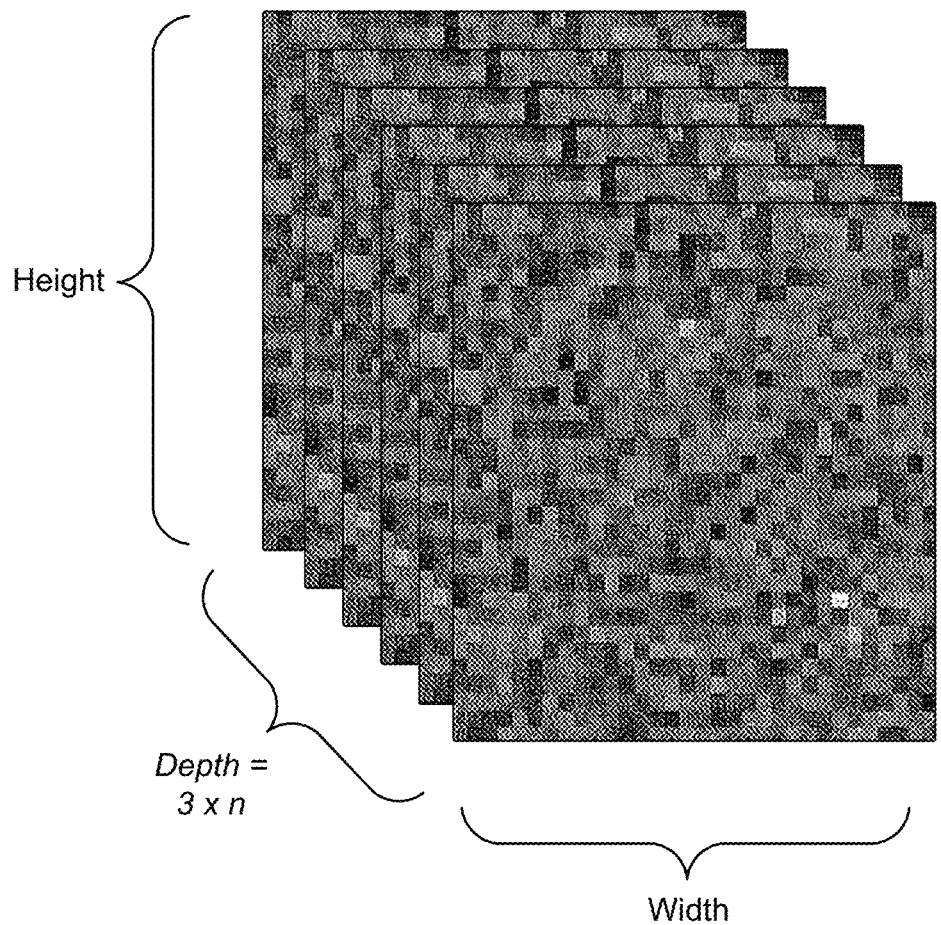
FIG. 6 is a set of feature planes that can be used for object verification (or authentication), in accordance with some embodiments.

FIG. 6 is an example of a set of feature planes that provide the features that are used to compute the distance from one radar image. The feature planes have a two-dimensional width and height (corresponding to the number of antennas), and have a depth equal to the number of features times the number of range bins. Accordingly, for each range bin, each feature will add one feature plane. From the radar system, if there are 32×32 antennas and 10 range bins and two features are used (amplitude and phase), then there will be 32×32×(10×2) feature planes, where the 2 corresponds to the amplitude and phase. If magnitude is also used, there will be 32×32×(10×3) or 32×32×30 or width (in pixels or antennae)×height (in pixels or antennae)×3n. Accordingly, when amplitude, phase, and magnitude are used (corresponding to three features), the depth is equal to 38n, with the 3 corresponding to the three features—Amplitude (A)/Phase ($\Phi$)/Magnitude (M)—and the n corresponding to the number of range bins.

In some cases, the Amplitude (A) and Phase ($\Phi$) for each pixel may be represented by a complex number, A+$\Phi$j, with j being the imaginary unit. Magnitude (M) may be computed as the absolute value of this complex number, which can be computed as the square root of a sum of the Amplitude (A) squared and the Phase ($\Phi$) squared. That is, in some cases, magnitude (M) can be computed as follows:

$$M = |A + \Phi \times j| = \sqrt{A^2 + \Phi^2}$$

Examples are described herein using amplitude (A), phase ($\Phi$), and magnitude (M) as features for each pixel. However, one of ordinary skill will appreciate that the same techniques apply to extracting only an amplitude (A) and a phase ($\Phi$) for each pixel, or even just amplitude (A) or phase ($\Phi$) for each pixel. Using amplitude, phase, and magnitude (M), a pixel $p_{ij}$ in an image P is written as:

$$p_{ij}=[A_1\ldots{}_n{}^{ij}\Phi_1\ldots{}_n{}^{ij}M_1\ldots{}_n{}^{ij}].$$

where n is a number of range bins and i/j are pixel indices in the image P (corresponding to pixel locations in the 2D image P, such as location (0,0) at the top-left corner of the image P, location (0,1) one pixel to the right of location (0,0), location (0,2) one pixel to the right of location (0,1), and so on). In one illustrative example, three range bins (n=3) can be used.

The distance computation engine 508 can compute a distance between features extracted from the two radar images (e.g., image 502 and image 504). In some cases, the distance between two radar images is determined by determining a distance between each corresponding pixel (e.g., between pixels in the two images at index location (0,0), between pixels in the two images at index location (0,1), and so forth) is computed. In one illustrative example, an absolute difference—that is, an absolute value of the difference—can be used to determine the distances. Other illustrative distance calculation techniques include a Hadamard Product, polynomial maps, element-wise multiplication, among other distance calculation techniques or a combination of such distances. Using an absolute difference as an example, given the two images 502 (denoted as P) and 504 (denoted as Q), the distance D is computed at each pixel as:

$$d_{ij}(p_{ij},q_{ij})=|p_{ij}-q_{ij}|.$$

In some examples, to make each distance (D) symmetric, the distances can be computed with the flipped versions of the images. For example, the first image 502 can be flipped over the y-axis (effectively creating a mirror image of the image 502), and features can be extracted from the flipped image. The distance between the features of the flipped version of the image 502 and the features of the image 504 can then be computed. The second image 504 can also be flipped over the y-axis (effectively creating a mirror image of the image 504), and features can be extracted from the flipped image. The distance between the features of the image 502 and the features of the flipped version of the image 504 can then be computed. The distance between the features of the flipped version of the image 502 and the features of the flipped version of the image 504 can also be computed. As a result, four sets of distance values can be generated from the two images 502 and 504 (first image and second image, mirrored first image and second image, first image and mirrored second image, mirrored first image and mirrored second image), resulting in more data that can be used during the object verification process. In some cases, in addition to or as an alternative to flipping an image over the y-axis, similar functions can be performed to flip an image over the x-axis, leading to even more permutations.

The resulting distances of the pixels in the two images can be stored. For example, the distances can be stored in an array, with each entry in the array corresponding to a distance for a pixel location. Distances can be calculated and stored for each feature plane, such as those in FIG. 6.

The similarity learning engine 510 can then learn similarities between feature distances and the matching labels to enable face verification using the radar images. The goal of the similarity learning engine 510 is to learn a mapping function $f$ between the matching labels L of the distances D, such that:

$$L=f(D).$$

In general, a label L—indicating whether the images match—is the target that a system wants to achieve when a machine learning algorithm is applied. Once the mapping function $f$ is learned or trained, the similarity learning engine 510 can receive as input the distances D computed by the distance computation engine 508. By applying the mapping function $f$ to the received distances D, the similarity learning engine 510 can determine the appropriate matching label L to generate for the input image 502. The matching label L can include either a label for a match (represented using a first value, such as 1) or a label for a non-match (represented using a second value, such as 0). The similarity learning engine can also output a similarity score 512. The similarity score 512 provides a probability of each label. For example, if label 0 (corresponding to a non-match) has a probability or score of 0.9, and label 1 (corresponding to a match) has probability 0.1, then the objects (e.g., faces) in the two images do not match. In another example, if the label 0 (corresponding to a non-match) has a score of 0.2, and label 1 (corresponding to a match) has a score of 0.8, then the objects (e.g., faces) in the two images do match.

Once mapping function $f$ is known, it can be applied to the distances D to produce the label L as the result. Any suitable method can be implemented to train and eventually determine the mapping function $f$ for this task. In some cases, finding $f$ may be directed through supervised learning when L is known for certain labeled training data and/or validation data (in this case, pre-labeled pairs of radar images or features). Illustrative examples include using a support vector machine (SVM), using a combination of principle component analysis (PCA) and SVM, using Partial Least Squares Regression (PLSR), using a neural network, or using any other learning-based technique. Feature matching may also include Han or Han-like feature extraction, integral image generation, Adaboost training, cascaded classifiers, or combinations thereof.

Figure 7:
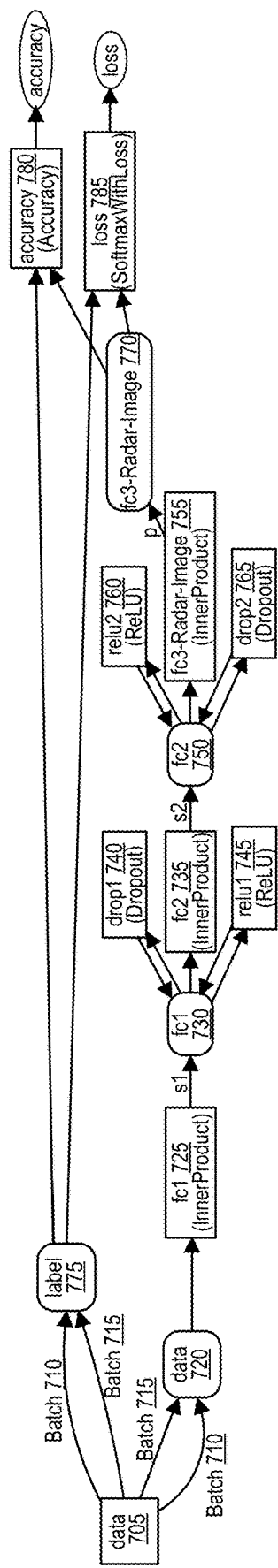
FIG. 7 is a diagram illustrating an example of a neural network that can be used for mapping distances between features of radar images to labels, in accordance with some embodiments.

FIG. 7 is a diagram illustrating an example of a neural network being trained to generate the mapping function $f$ for mapping distances between features of radar images to labels. The architecture of the neural network includes three Fully Connected Layers (labeled fc1 730, fc2 750, and fc3-Radar-Image 770), followed by SoftMax 785. Dropout layers (740, 765) can be used to reduce over-fitting, and rectified linear units (ReLUs) (745, 760) are used as activations. Data 705 including radar images 720 and optionally labels 775 can be input to the neural network, the labels 775 characterizing validation data radar images and training data radar images 720. In some cases, the validation radar images and the training radar images 720 and corresponding labels 775 can be processed in batches (batch 710, batch 715), with each batch including a subset of all of the available images. Each of the radar images is reduced to a first size s1 (e.g., a size of 64) after the first fully connected layer (fc1 730), and is reduced to a second size s2 (e.g., a size of 32) after the second fully connected layer (fc2 750), where the second size s2 is smaller than the first size s1. After the third fully connected layer (fc3 770), a probability p is generated for each label, including a probability for the label indicating a match and a probability for the label indicating a non-match.

In some examples, the radar data can be combined with other modalities or features (e.g., RGB images, depth images, or other data) in order to further improve object verification accuracy. For example, 60 GHz radar images and RGB images of objects can be processed in combination to perform object verification. In one illustrative example, two RGB images (e.g., an enrolled image and an input image captured at runtime) can be obtained. Features can be extracted from the two RGB images, and a distance can be determined between the features. A similarity can then be determined between the features. These RGB features may provide additional feature planes by providing additional features (e.g., red may be a feature, blue may be a feature, green may be a feature). RGB features may be alternately replaced with hue, saturation, and lightness/brightness/value (HSL/HSB/HSV) features.

The neural network shown in FIG. 7 is used for illustrative purposes. Any suitable neural network can be used as the mapping function $f$. In some cases, the neural network can be a network designed to perform classification (generating a probability for a non-match label or a match label). Illustrative examples of deep neural networks that can be used include a convolutional neural network (CNN), an autoencoder, a deep belief net (DBN), a Recurrent Neural Networks (RNN), or any other suitable neural network. Ultimately, the function $f$ produced include generating a (optionally weighted) polynomial using one or more different features of the images as terms to ultimately produce one or more values to compare to one or more thresholds, eventually resulting in a single determination L.

Figure 8:
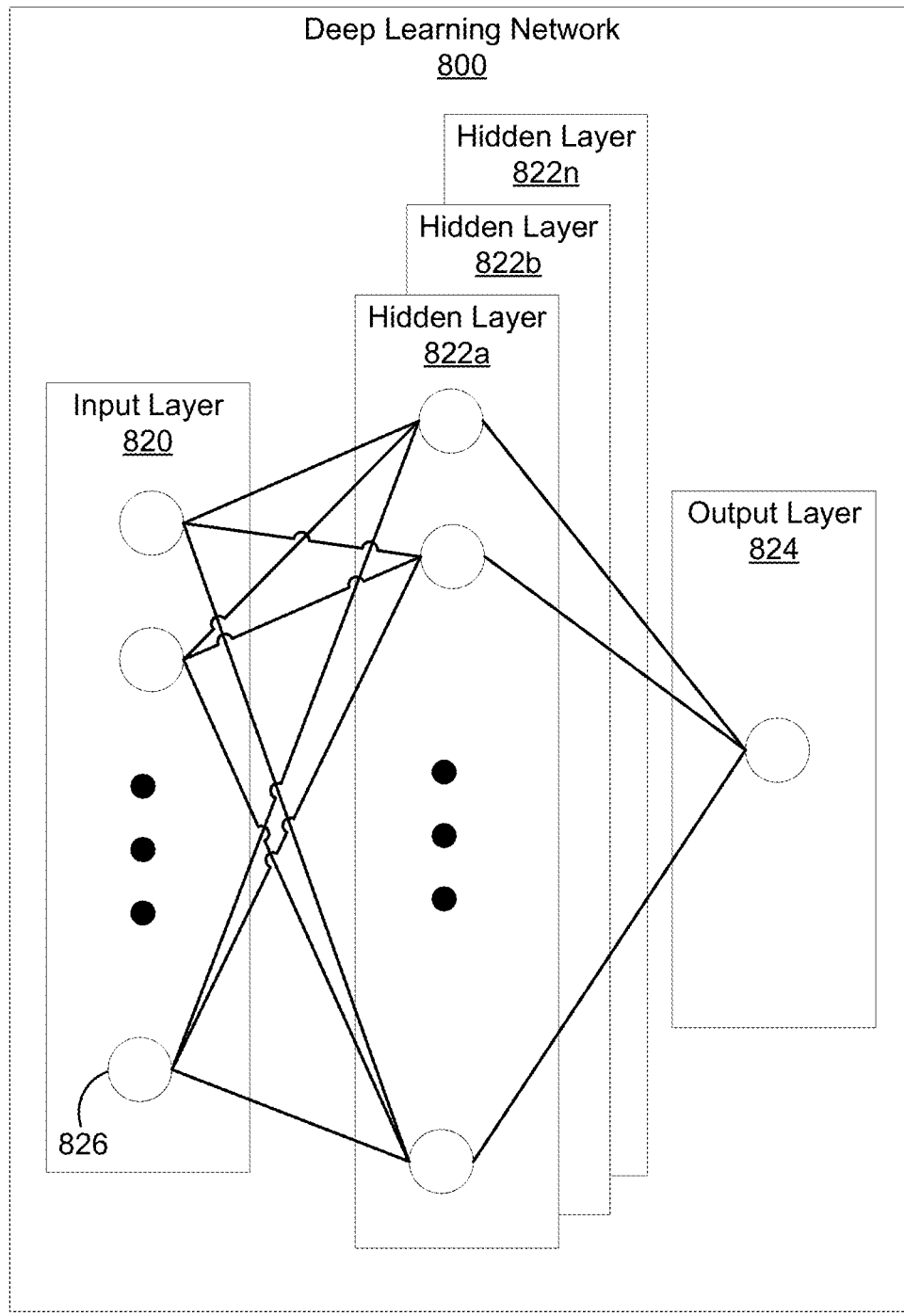
FIG. 8 is a block diagram illustrating an example of a deep learning network, in accordance with some examples.

FIG. 8 is an illustrative example of a deep learning neural network 800 that can be used by the segmentation engine 104. An input layer 820 includes input data. In one illustrative example, the input layer 820 can include data representing the pixels of an input video frame. The deep learning network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The deep learning network 800 further includes an output layer 824 that provides an output resulting from the processing performed by the hidden layers 822a, 822b, through 822n. In one illustrative example, the output layer 824 can provide a classification and/or a localization for an object in an input video frame. The classification can include a class identifying the type of object (e.g., a person, a dog, a cat, or other object) and the localization can include a bounding box indicating the location of the object.

The deep learning network 800 is a multi-layer neural network of interconnected nodes. Each node can represent a piece of information. Information associated with the nodes is shared among the different layers and each layer retains information as information is processed. In some cases, the deep learning network 800 can include a feed-forward network, in which case there are no feedback connections where outputs of the network are fed back into itself. In some cases, the network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the hidden layers 822a-n can transform the information of each input node by applying activation functions to these information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 824, at which an output is provided. In some cases, while nodes (e.g., node 826) in the deep learning network 800 are shown as having multiple output lines, a node has a single output and all lines shown as being output from a node represent the same output value.

In some cases, each node or interconnection between nodes can have a weight that is a set of parameters derived from the training of the deep learning network 800. For example, an interconnection between nodes can represent a piece of information learned about the interconnected nodes. The interconnection can have a tunable numeric weight that can be tuned (e.g., based on a training dataset), allowing the deep learning network 800 to be adaptive to inputs and able to learn as more and more data is processed.

The deep learning network 800 is pre-trained to process the features from the data in the input layer 820 using the different hidden layers 822a, 822b, through 822n in order to provide the output through the output layer 824. In an example in which the deep learning network 800 is used to identify objects in images, the network 800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the deep neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 800 is trained well enough so that the weights of the layers are accurately tuned.

For the example of identifying objects in images, the forward pass can include passing a training image through the network 800. The weights are initially randomized before the deep neural network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target} - \text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

The deep learning network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning network 800 can include any other deep network other than a CNN, such as an autoencoder, a deep belief nets (DBNs), a Recurrent Neural Networks (RNNs), among others.

Figure 9:
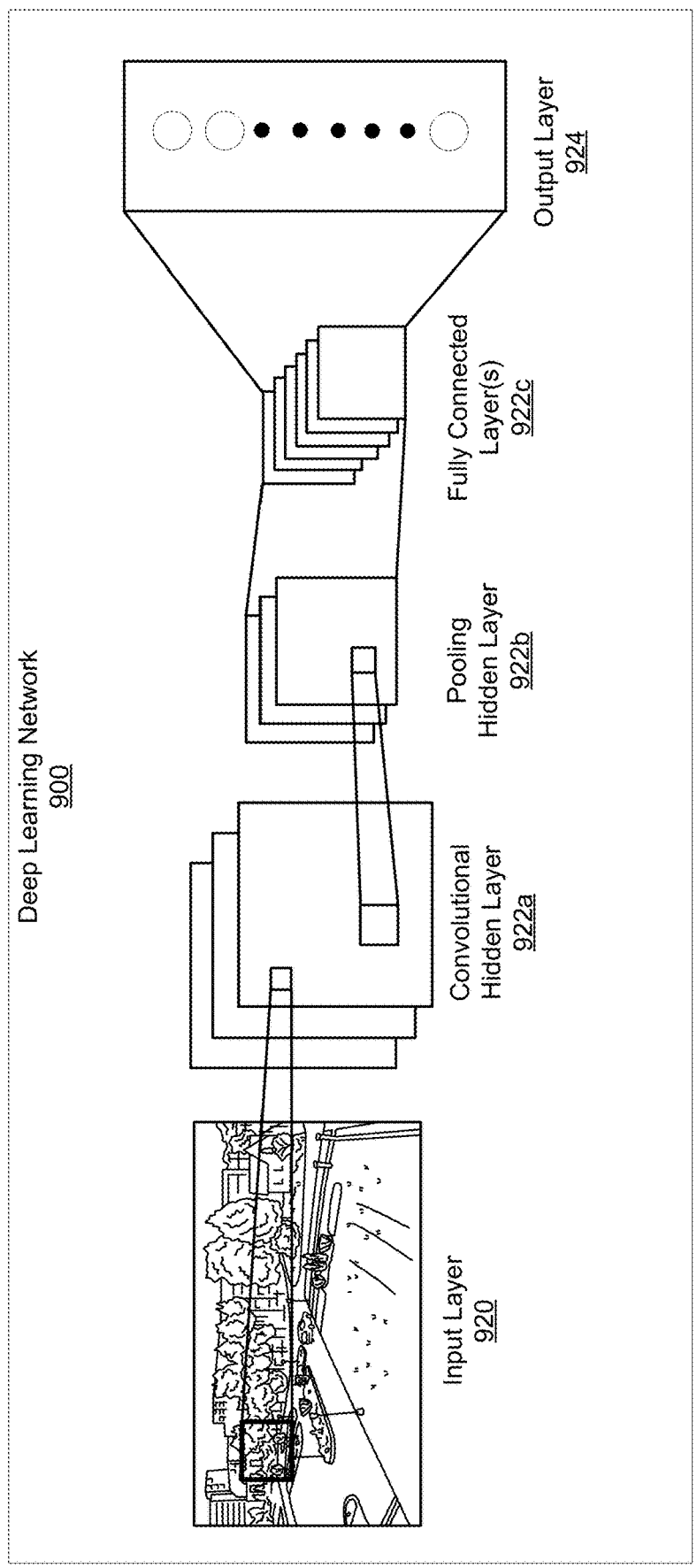
FIG. 9 is a block diagram illustrating an example of a convolutional neural network, in accordance with some examples.

FIG. 9 is an illustrative example of a convolutional neural network 900 (CNN 900). The input layer 920 of the CNN 900 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922*a*, an optional non-linear activation layer, a pooling hidden layer 922*b*, and fully connected hidden layers 922*c* to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 is the convolutional hidden layer 922*a*. The convolutional hidden layer 922*a* analyzes the image data of the input layer 920. Each node of the convolutional hidden layer 922*a* is connected to a region of nodes (pixels) of the input image called a receptive field. The convolutional hidden layer 922*a* can be considered as one or more filters (each filter corresponding to a different activation or feature map), with each convolutional iteration of a filter being a node or neuron of the convolutional hidden layer 922*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922*a*. Each connection between a node and a receptive field for that node learns a weight and, in some cases, an overall bias such that each node learns to analyze its particular local receptive field in the input image. Each node of the hidden layer 922*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922*a* is due to each node of the convolutional layer being applied to its corresponding receptive field. For example, a filter of the convolutional hidden layer 922*a* can begin in the top-left corner of the input image array and can convolve around the input image. As noted above, each convolutional iteration of the filter can be considered a node or neuron of the convolutional hidden layer 922*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922*a*. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922*a*.

The mapping from the input layer to the convolutional hidden layer 922*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 922*a* can include several activation maps in order to identify multiple features in an image. The example shown in FIG. 9 includes three activation maps. Using three activation maps, the convolutional hidden layer 922*a* can detect three different kinds of features, with each feature being detectable across the entire image.

In some examples, a non-linear hidden layer can be applied after the convolutional hidden layer 922*a*. The non-linear layer can be used to introduce non-linearity to a system that has been computing linear operations. One illustrative example of a non-linear layer is a rectified linear unit (ReLU) layer. A ReLU layer can apply the function $f(x)=max(0, x)$ to all of the values in the input volume, which changes all the negative activations to 0. The ReLU can thus increase the non-linear properties of the network 900 without affecting the receptive fields of the convolutional hidden layer 922*a*.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

As noted above, any suitable method can be implemented to train the mapping function $f$, such as SVM, a combination of PCA and SVM, PLSR, a neural network, or using any other learning-based technique. Feature planes for each image may include radar features (range bins, amplitude, phase, magnitude), visual features (RGB, HSL, etc.), or combinations thereof.

Figure 14:
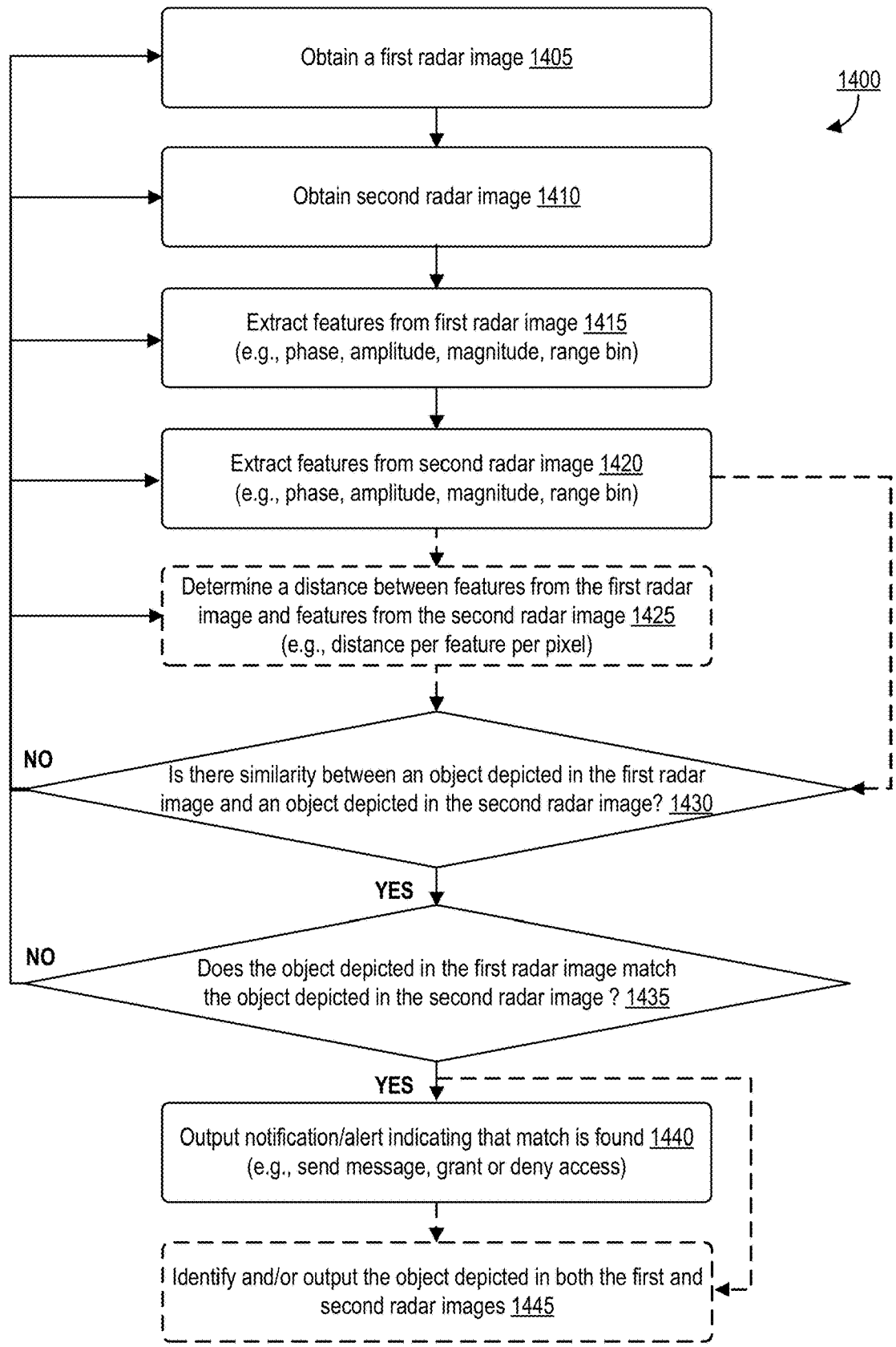
FIG. 14 is a flowchart illustrating an example of a process of performing object verification using radar images using the object verification techniques described herein, in accordance with some examples.

FIG. 14 is a flowchart illustrating an example of a process 1400 of performing object verification using radar images using the object verification techniques described herein. At block 1405, the process 1400 includes obtaining a first radar image. The first radar image may be obtained using a radar antenna array 1330 as in FIG. 13A and FIG. 13B, for example. In some implementations, a visual image (e.g., a color raster image with RGB or HSL values for each pixel) may be alternatively or additionally captured or otherwise obtained simultaneously or alongside capture of the first radar image.

At block 1410, the process 1400 includes obtaining a second radar image. The second radar image may be a previously-captured enrolled radar image of a known object (e.g., a face or other known object). The second radar image may be obtained by retrieving the second radar image from an enrolled database that stores radar images (and optionally other types of images) of known objects. In some implementations, in block 1410 a visual image (e.g., a color raster image with RGB or HSL values for each pixel) may alternatively or additionally be obtained simultaneously or alongside obtaining the second radar image. Obtaining of the first radar image in block 1405 may automatically trigger obtaining of the second radar image in block 1410. For instance, obtaining of the first radar image may trigger a computing device to obtain enrolled images, which can be compared to the first radar image. Other times, blocks 1410 may actually occur before block 1405, such as when certain enrolled radar images are kept in a cache of commonly compared faces or other objects, where the process often uses the same few enrolled images.

At block 1415, the process 1400 includes extracting one or more features from the first radar image obtained at block 1405. In some examples, the features may be extracted for each individual pixel. The features extracted for a pixel may correspond to the data received by the antenna in the antenna array 1330 corresponding to the pixel. For instance, the features extracted from the first radar image may include phase, amplitude, and magnitude (e.g., for each pixel), and may also in some cases include which of a number of range bins the RF signal fell into. Where visual data is included alongside the radar image, the features may additionally or alternatively include red, green, blue, hue, saturation, and/or luminosity values for particular pixels. At block 1420, the process 1400 includes extracting one or more features from the second radar image obtained at block 1410, which may include the same types of features as discussed above with respect to block 1415. In some examples, features may be extracted for a group of two or more pixels.

At optional block 1425, the process 1400 includes determining a distance between features from the first radar image and features from the second radar image. Multiple such distances may be computed, for example on a per-pixel and per-feature basis. For example, a distance can be computed between the phase at pixel (0,0) in the first radar image and the phase at pixel (0,0) in the second radar image. Similar distances are computed for the amplitude at pixels (0,0) in both the first and second radar images, and optionally for the magnitude at pixels (0,0) in both radar images. Distances may, in some cases, be computed for the range bins at pixels (0,0) in both radar images. Distances for the same features are then computed for pixel (0,1) in both radar images, and for pixel (1,0) in both radar images, and for pixel (1,1) in both radar images, and so forth until all or a threshold number of pixels have been analyzed. Each computed distances may be a Cosine distance, Euclidean distance, Manhattan distance, Minkowski distance, Mahalanobis distance, a combination thereof, or another suitable distance.

At block 1430, the process 1400 determines, based on the features extracted from the first radar image in block 1415 and on the features extracted from the second radar image in block 1420 (and optionally based on the distances computed in block 1425), whether the objects are similar. If the features are similar enough—such as when the distances computed in block 1425 are smaller or shorter or otherwise less than a predetermined distance threshold—then the objects are determined to be similar. If the objects are determined to be similar, the process 1400 moves on to block 1435. If not, in some cases, the process 1400 can return to block 1425 to calculate certain distances that may not have previously been determined (e.g., based on new features that the process 1400 had not previously calculated distances for, such as magnitude). In some cases, in response to a "no" decision at block 1430, the process 1400 can, at block 1415 and/or 1420, extract additional features the process 1400 had not previously extracted. In some cases, in response to a "no" decision at block 1430, the process 1400 can obtain new radar images at blocks 1405 and/or 1410 (e.g., to compare the first radar image to a different enrolled second radar image from the enrolled database, or to capture a new image using the antenna array 1330 if the first radar image fails to match any enrolled images due to poor quality of capture).

At block 1435, the process 1400 determines, based on the similarity or similarities found in block 1430, whether the object depicted or otherwise represented in the first radar image matches the object depicted or otherwise represented in the second radar image—that is, whether the identity of the pictured objects is the same. In some cases, the similarities in block 1430 may still be determined at a per-feature or per-pixel basis, while block 1435 concerns the entire images as a whole. In some examples, the determination at block 1440 may also be made based on generating a matching score based on the similarities found in block 1430, and comparing the matching score to a predetermined matching score threshold. In such examples, if the matching score exceeds the threshold, the objects are determined to match and the process 1400 continues to block 1440. If the matching score fails to exceed the threshold, the objects are determined to not match and the process 1400 returns to block 1430 (e.g., to examine more similarities) or returns to any of the blocks above block 1430, as discussed with respect to block 1430.

At block 1440, the process 1400 generates and outputs a notification or alert indicating that a match has been found. The notification or alert may take the form of transmission of an automated message such as an email or text message, or a notification on a mobile device. For example, if the object recognition process 1400 is used to search for faces of criminals in a criminal database, and a criminal is found to be present at a location at which the criminal should not be present, a notification may be sent to the police or appropriate authorities. If the object recognition process 1400 is used for access control or otherwise for authentication, and the match indicates that a scanned face belongs to a user who has previously been authorized to enter a restricted area or to access a particular computing device, then access to the restricted area may be granted by sending a notification to a door lock mechanism requesting to unlock the door, and/or access to the computing device may be granted by automatically logging in to the computing device using an account associated with the user.

At block 1445, the process 1400 optionally outputs or identifies the object that was determined at block 1435 to be depicted in both the first radar image and the second radar image. For instance, if the object that was determined at block 1435 to be depicted in both the first radar image and the second radar image is a face of a particular person, then the person's name—and/or another identifier (such as an employee number, username, email address, phone number, social security number, driver's license number, or ID number)—can be identified. Alternately or additionally, the object itself can be output, either as a grouped collection of one or more features, as an image of just the object (without anything else), or a model of the object, such as three-dimensional computer-assisted design (CAD) model.

Figure 17:
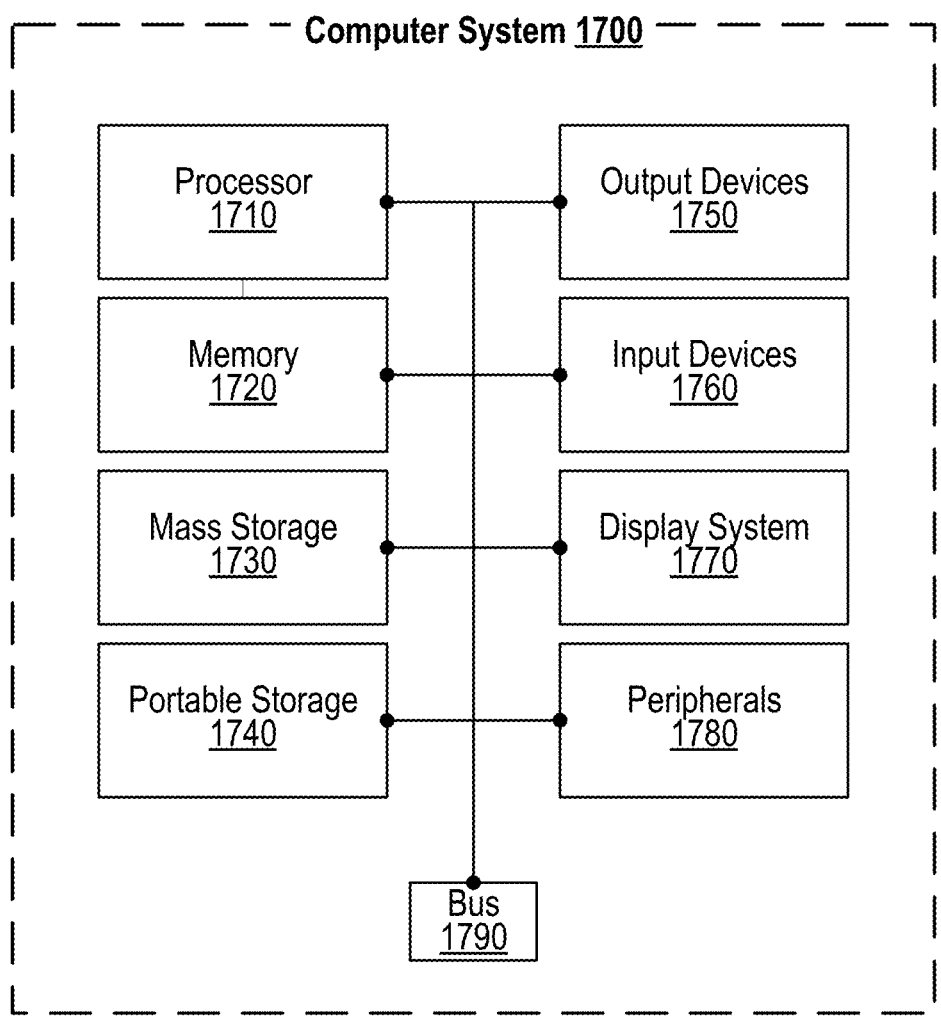
FIG. 17 is a block diagram of an exemplary computing device that may be used to implement some aspects of the technology, in accordance with some examples.

In some examples, the process 1400 may be performed by a computing device or an apparatus, which can include the object verification system 500 shown in FIG. 5, the computing device 1310 shown in FIG. 13A, and/or the computing system 1700 shown in FIG. 17. In some cases, the computing device or apparatus may include a processor, microprocessor, microcomputer, or other component of a device that is configured to carry out the steps of process 1400. In some examples, the computing device or apparatus may include one or more sensors, cameras, or other input devices configured to capture radar images. In some cases, the computing device may include a mobile device with one or more sensors (e.g., a camera, a sensor, a combination thereof, or any other suitable sensor that can capture radar images and/or other types of images). In some cases, the computing device may include a display for displaying one or more images or other information. In some cases, the computing device may include a video codec. In some examples, the one or more sensors, cameras, or other input devices are separate from the computing device, in which case the computing device receives the captured image data. The computing device may further include a network interface configured to communicate data. The network interface may be configured to communicate Internet Protocol (IP) based data or other suitable network data.

Process 1400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
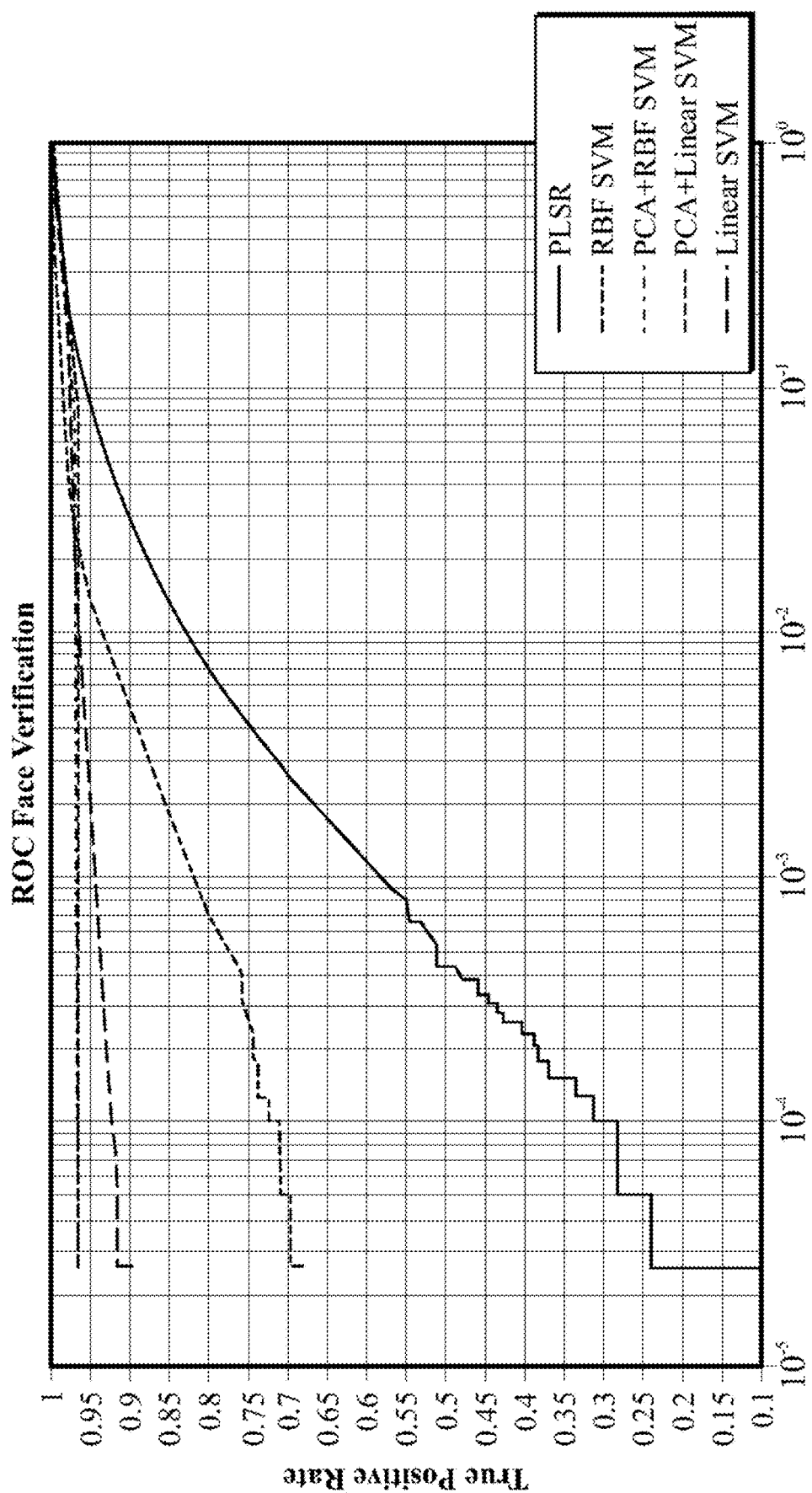
FIG. 10 is a graph illustrating results of different similarity methods performed on a first data set, in accordance with some examples.
Figure 11:
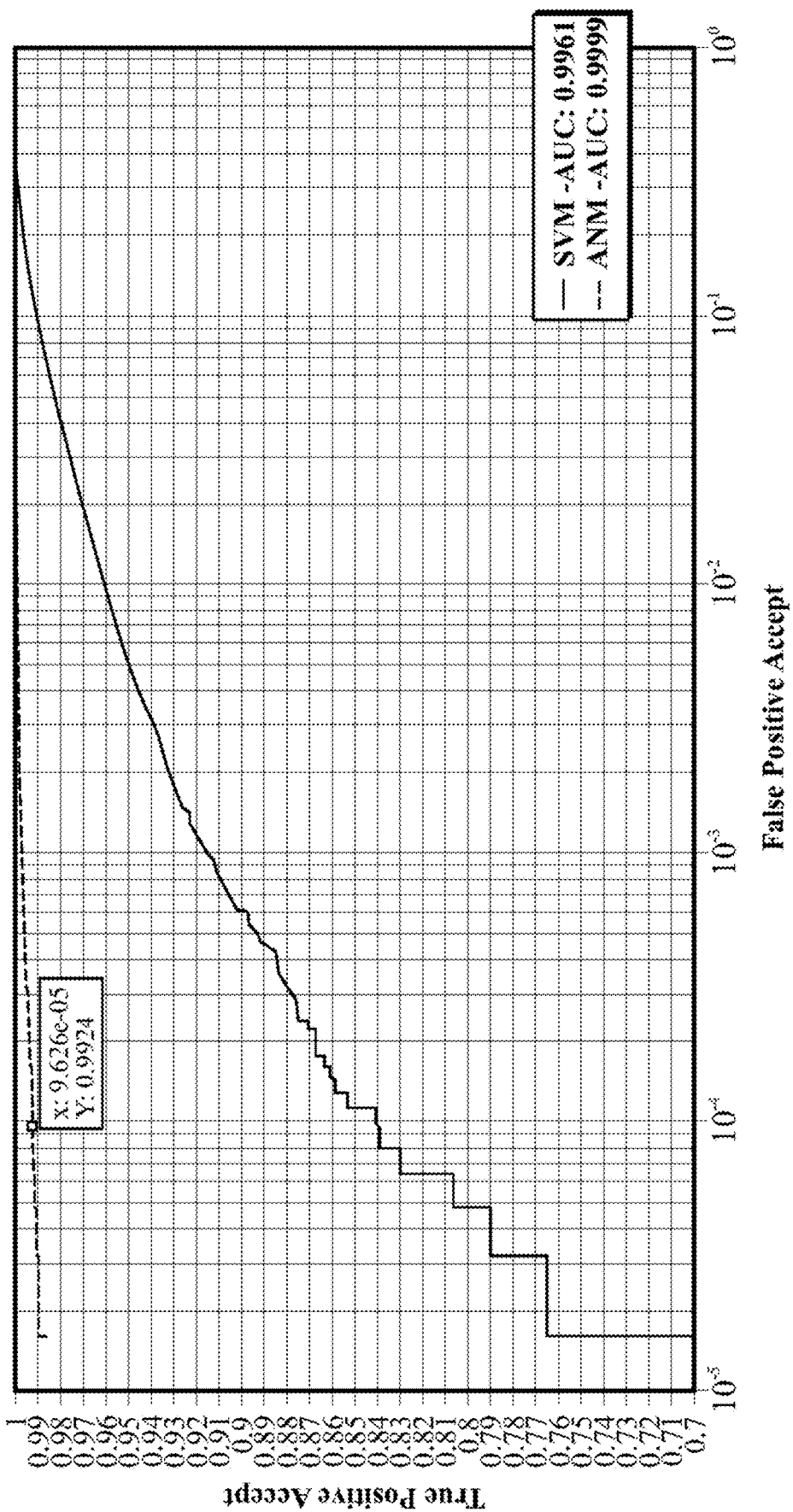
FIG. 11 is a graph illustrating results of different similarity methods performed on a second data set, in accordance with some examples.
Figure 12:
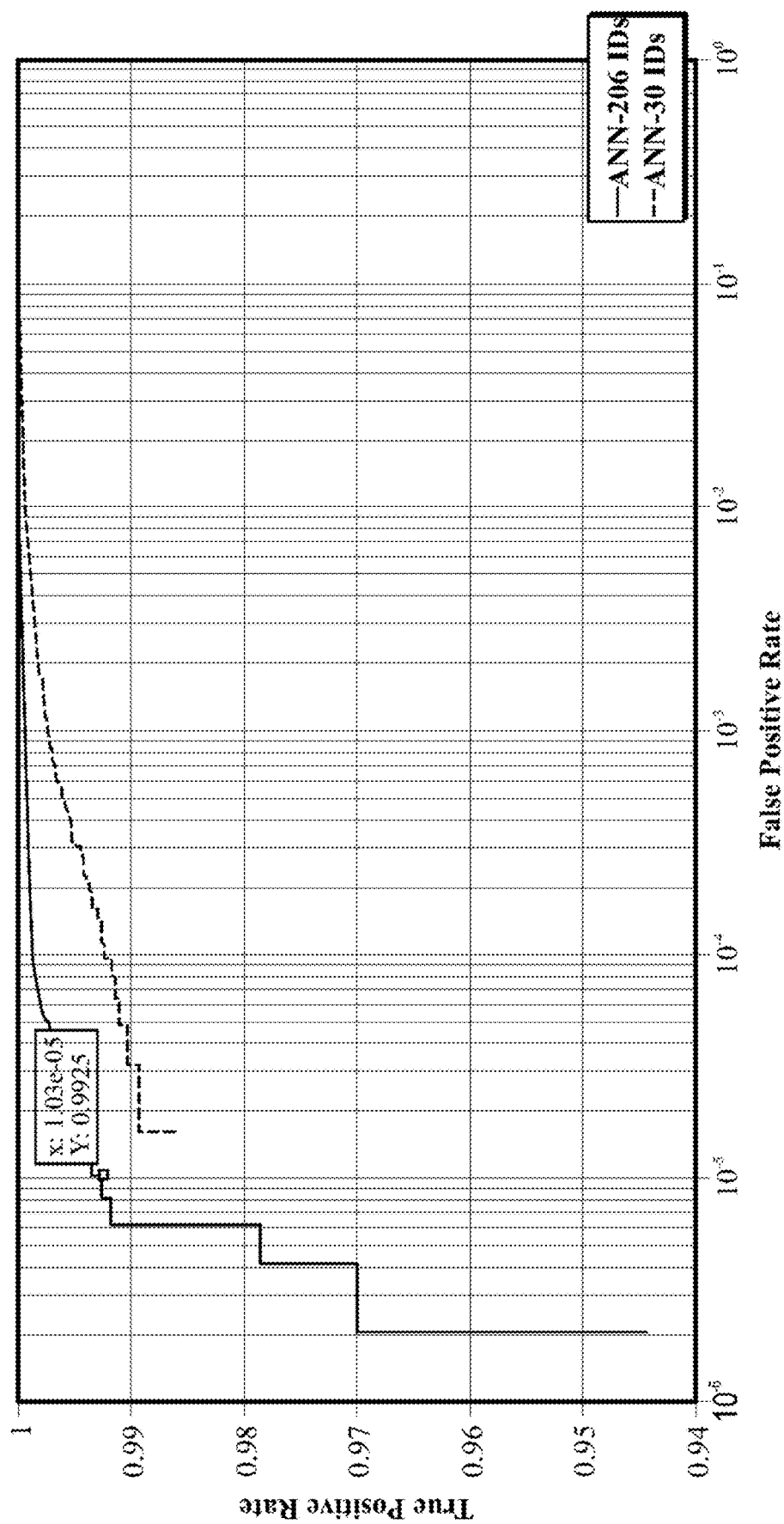
FIG. 12 is a graph illustrating results of different similarity methods performed on a third data set, in accordance with some examples.

FIG. 10, FIG. 11, and FIG. 12 are graphs illustrating results of different similarity methods performed on different data sets. With respect to the graph shown in FIG. 10, the similarity methods that were applied to a first data set include PLSR, RBF SVM, a combination of PCA and RBF SVM, a combination of PCA and linear SVM, and linear SVM similarity methods. The first data set included 20 IDs. As shown, for such a small dataset, linear SVM performs well. Performance slightly improved using PCA with the linear SVM. With respect to the graph shown in FIG. 11, the similarity methods that were applied to a second data set include SVM and neural network based similarity methods. The second data set included 30 IDs. As shown, the neural network (ANN) based similarity method performed better than SVM, as the data contains more variation in terms of distance, angles, and people. With respect to the graph shown in FIG. 12, a neural network based similarity method was applied to a third data set. The third data set included 206 IDs. The graph in FIG. 12 shows a comparison of the neural network performance on the second data set (30 IDs) and the third data set (206 IDs). As shown, more data in the third data set improved the performance of the neural network (ANN) based similarity method.

In some cases, before features are extracted or compared, or distances calculated, certain modifications to the images can also optionally be performed. Such modifications can expand the pool of data for training or verification, or can compensate for known differences in perspective between an enrolled image and a captured image. For example, if the capture device is a portable device with sensors such as accelerometers or gyroscopes, the device may detect whether it has inadvertently been positioned upside-down relative to its normal capture orientation, or at a right angle from its normal capture orientation, or at some other angle. An image produced in such a state may be rotated about a point or axis to compensate for this known rotation of the device to try to make matching to enrolled images easier for the algorithms described herein. As described earlier herein, an image may likewise be flipped about an axis. Images may also be distorted, skewed, warped, twisted, resized, cropped, displaced, puckered, bloated, corner-pinned, or otherwise filtered to compensate for or remove lens distortion, gas distortion, motion blur, wide-angle distortion, barrel distortion, or to correct perspective. For example, if the object captured in the image is not directly facing the capture device when the image is captured (or is otherwise captured from a different perspective than the image it is being compared to), a perspective warp may be applied to simulate/approximate what the object would look like if it were directly facing the capture device (or is otherwise captured from a more similar perspective to the image it is being compared to).

FIG. 13A is an antenna array system architecture that can be used to capture the radar images, in accordance with some examples. The diagram of FIG. 13A illustrates a radar system including an antenna array 1330 of multiple antennae 1390 that are used to send and/or receive electromagnetic radiation (e.g., radio waves, microwaves, infrared waves, light, ultraviolet light) that can be used to capture the radar images (radiograms) described above, with an example radar image 1380 illustrated in FIG. 13A. In the implementation illustrated in FIG. 13A, the radar system includes one or more transceivers 1320 (alternatively one or more transmitters) that transmit a one or more electromagnetic signals, for example radio frequency (RF) signals such as a millimeter wave signals or microwave signals, through multiple antennae 1390 of an antenna array 1330, the electromagnetic signals 1340 reflecting off of one or more objects 1350 (e.g., a face) in the environment and captured after reflecting by the one or more transceivers 1320 (alternatively one or more receivers) via the antennas 1330.

In some implementations, one transceiver 1320 (or transmitter and receiver pair) may be used. In some implementations, multiple transceivers 1320 (or pairs of transmitters and receivers) may be included, such as one per antenna 1390 in the array 1330. In some implementations, the transceiver(s) 1320 include a single transmitter and multiple receivers (e.g., one receiver per antenna). Multiple receivers may provide additional feature data by allowing each antenna to independently gather data. In other implementations, the transceiver(s) 1320 include a single receiver and multiple transmitters (e.g., one transmitter per antenna). Multiple transmitters may provide a finer degree of control over independent transmissions from different antennae 1390 of the antenna array 1330. If the antenna array 1330 is two dimensional as illustrated in FIG. 13B, multiple transceivers 1320 (or transmitters or receivers or pairs thereof) may be included, such as one for each row along the width 1334 of the array 1330, or one for each column along the height 1332 of the array 1330. If the antenna array is three dimensional—for example, including planar arrangements of two dimensional antenna arrays 1330 as illustrated in FIG. 13B stacked along the depth dimension 1336, multiple transceivers 1320 (or transmitters or receivers or pairs thereof) may be included, such as one for each row along the width 1334 of the array 1330, or one for each column along the height 1332 of the array 1330, one for each planar arrangement, one for each "row" in the depth dimension 1336, or some combination thereof. Ultimately, the transceiver 1320 may include any combination of any number of transmitters from one up to the number of antennae, any number of receivers from one up to the number of antennae, any number of transceivers from one up to the number of antennae, or any combination thereof.

The antenna array system architecture of FIG. 13A also illustrates an optional multiplexer 1315, at which signals received by the transceiver(s) 1320 (or receivers) from the different antennae 1390 in the antenna array 1330 may be multiplexed into a single data stream for output on a single data line to the computing device 1310. While only one multiplexer 1315 is illustrated in FIG. 13A, it should be understood that in some cases multiple may be used, such as one per row, column, plane, or "row" in the depth dimension 1360. Regardless of whether multiplexers 1315 are used between the one or more transceivers 1320 (or one or more receivers) and the computing device 1310, the computing device 1310 ultimately receives the signal data from the one or more transceivers 1320 (or one or more receivers) and generates a computed radar image (radiogram) 1380 based on these signals. Distances from the antenna array 1330 to the object/target 1350 the surrounding area may be computed based on measuring the time from transmission of a particular pulse or wave to receiving the echo/reflection of the pulse or wave from a target object 1350. Each distance is then identified in the resulting radar image, either along an absolute scale or along a scale relative to other distances used to generate the resulting radar image, using color, brightness, or some other image differentiator. Scatter of the wave or pulse, which may signify surface complexity, may be signified by intensity of the returning pulse or wave, and may also be tracked in the resulting radar image along an absolute or relative scale using brightness or color. While the radar image 1380 is depicted as a two-dimensional image, it may in some cases be a three-dimensional image, such as a computer-assisted design (CAD) model, which may include graphical textures if the radar system is paired with a camera, or may lack graphical textures if the radar system is not paired with a camera.

The antenna array system architecture of FIG. 13A also illustrates an optional block 1325, which may include one or more amplifiers, filters, phase shifters, multiplexers, demultiplexers, or combinations thereof. Amplifiers may amplify signals to be transmitted by the antenna array 1330 or signals received by the antenna array 1330, either before or after filtering. Filters may include, for example, low-pass filters, high-pass filters, band-pass filters, matched filters, linear time invariant (LTI) filters, other linear filters, other non-linear filters, or combinations thereof. Phase shifters may be used to control the phase of a signal before transmission by an antenna 1390, or optionally after receipt of a signal by an antenna 1390. Multiplexers may be used to group signals received from the various antennae 1390 of the antenna array 1330, and demultiplexers may be used to separate signals before they are transmitted by the various antennae 1390 of the antenna array 1330. Other electrical components, such as resistors, capacitors, inductors, power supplies, diodes, op amps, switches, transistors, or combinations thereof, may also be integrated at block 1325 or otherwise throughout the system of FIG. 13A.

The transceiver(s) 1320 and antenna array 1330 may optionally operate as a frequency-modulated continuous-wave radar (FM-CW) system or another type of continuous-wave radar system. While radar is described above, it should be understood that Light Detection and Ranging (LIDAR) and Sound Detection and Ranging (SODAR) or Sound Navigation and Ranging (SONAR) transceivers and antennae may be alternately or additionally used in this array or a similar array and similar feature distance comparison system. In some cases, the transceiver(s) 1320 and antenna array 1330 may operate as real aperture radar (RAR), synthetic aperture radar (SAR), inverse aperture radar (ISAR), through wall radar imaging, ground-penetrating radar (GPR), 3-D radar, multi-wave radar, multi-band radar, monopulse radar 3-D imaging, or a combination thereof.

A computing device 1310 is also illustrated in FIG. 13, connected to both the transceiver(s) 1320 and optionally the antennas of the antenna array. This computing device 1310 may be a computing system 1700, as discussed in FIG. 17, and may interpret the radar signals, obtain the amplitudes and phases, calculate the magnitudes, generate the radar images based on these signals (such as captured radar image 1380), and perform the image comparison to enrolled images from the enrolled database 1360 (such as enrolled radar image 1370 and/or enrolled camera image 1375), perform recognition based on this comparison, and perform verification features discussed herein based on whether the comparison and recognition were successful or not. The enrolled database 1360 is also illustrated as communicatively coupled to the computing device 1310. The enrolled database 1360 may contain enrolled radar images to which the radar images captured by the array are compared. The enrolled database 1360 may also include other enrolled images, such as camera images, which RGB or HSL features captured alongside (or instead of) the radar images can be compared to. Examples of both an enrolled radar image 1370 and an enrolled visual camera image 1375 are illustrated in FIG. 13A as being stored in enrolled database 1360. The enrolled database 1360 may be at least partially stored locally on the computing device 1310, may be at least partially accessible through a local area network (LAN), wireless local area network (WLAN), wide area network (WAN), or the Internet, or some combination thereof. It should be understood that the term "enrolled database 1360" may also refer to data structures other than databases, such as tables, hash tables, trees, in-memory key-value stores, arrays, arraylists, dictionaries, decentralized data structures, or combinations thereof.

The antenna array 1330 of FIG. 13A and/or FIG. 13B may in some cases be a phased array or electronically scanned array, such as a passive electronically scanned array (PESA), an active electronically scanned array (AESA), a conformal antenna, or some combination thereof. In such cases, the computing device 1310 may control phase shifters associated with each individual antenna of the array, allowing the radio waves to be electronically steered to point in different directions without moving the antennas. While the antenna array 1330 of FIG. 13A and/or FIG. 13B is illustrated as a linear arrangement of ten antennae, it should be understood that more complex two-dimensional planar arrays, such as the 1024-antenna arrangement described earlier herein that with 32 antennae along a width dimension and 32 antennae along a height dimension, can be used instead. Such arrays need not be limited to planar arrangements either, and may be curved or polyhedral in shape and arrangement. Even more complex three-dimensional arrays may be used as well, with antennae arranged along a depth dimension in addition to width and height dimensions.

FIG. 13B is an example of an antenna array that can be used to capture the radar images, in accordance with some examples. The example antenna array 1330 of FIG. 13B is a planar antenna array 1330 including 36 antennae in a 6 antenna by 6 antenna grid, the antennae labeled 1390A-Z and 1390AA-JJ. The example antennae are arranged in an antenna array 1330 whose height 1332 and width 1334 both measure 17.80 mm±0.1 mm, and whose depth measures 0.65 mm or less. While this example antenna array 1330 has these specific measurements, other measurements may be used. For example, the antenna array height 1332 and width 1334 may each be between 15 mm and 20 mm in length, or between 10 mm and 30 mm in length, or between 5 mm and 50 mm in length, or any range using any combination of those values or any values in between. The height 1332 and width 1334 need not be the same length. The depth 1336 may measure 0.5 mm or less, 1 mm or less, 1.5 mm or less, 2 mm or less, 2.5 mm or less, 3 mm or less, 3.5 mm or less, 4 mm or less, 4.5 mm or less, 5 mm or less, or any range using any combination of those values or any values in between. The depth measurement may be a depth of the entire antenna array 1330 including the antennae, or may be a measurement of just a board—such as a circuit board—upon which the antennae are electrically coupled, affixed, printed, or otherwise positioned. The width and/or height and/or diameter of each antenna may be between 2 mm and 3 mm, between 1 mm and 4 mm between 0.5 mm and 5 mm, or any range using any combination of those values or any values in between. A depth of each antenna may measure 0.1 mm or less, 0.5 mm or less, 1 mm or less, 1.5 mm or less, 2 mm or less, 2.5 mm or less, 3 mm or less, 3.5 mm or less, 4 mm or less, 4.5 mm or less, 5 mm or less, or any range using any combination of those values or any values in between. The antenna array 1330 may also include other components not illustrated in FIG. 13B, such as power supply components, the transceiver(s) 1320 (or receivers and/or transmitters) of FIG. 13A, the multiplexer(s) 1315 of FIG. 13A, the computing device 1310 of FIG. 13A, any components discussed with respect to block 1325 of FIG. 13A, a storage device storing at least a portion of the enrolled database 1360 of FIG. 13A, any components illustrated in or discussed with respect to FIG. 17, and/or any combination thereof.

The first row of antennae in the antenna array 1330 of FIG. 13B includes antennae 1390A-1390F. The second row of antennae in the antenna array 1330 of FIG. 13B includes antennae 1390G-1390L. The third row of antennae in the antenna array 1330 of FIG. 13B includes antennae 1390M-1390R. The fourth row of antennae in the antenna array 1330 of FIG. 13B includes antennae 1390S-1390X. The fifth row of antennae in the antenna array 1330 of FIG. 13B includes antennae 1390Y, 1390 Z, and 1390AA-1390DD. The sixth row of antennae in the antenna array 1330 of FIG. 13B includes antennae 1390EE-1390JJ. In some cases, certain antennae 1390 may be missing, such as antenna 1390B, antenna 1390F, antenna 1390EE, and/or antenna 1390 JJ, which are drawn in dashed lines. While the antennae are drawn as three-dimensional blocks, they may take alternate forms, including two-dimensional antennae printed on the board of the antenna array 1330, as in a printed circuit board (PCB).

While the board of the antenna array 1330 appears to be flat, it may be curved in a concave form, a convex form, or some combination thereof, and may be curved along a single dimension (e.g., only along the width dimension 1332 or the height dimension 1334) or along two dimensions (e.g., along both the width dimension 1332 and the height dimension 1334). Further, multiple planar antenna arrays 1330 such as the one in FIG. 13B may be stacked to create a three-dimensional antenna array 1330. While the antennae are arranged in a regular rectangular grid in FIG. 13B, they may instead be arranged along a non-regular rectangular grid, a radial grid, or along a non-rectangular polygonal grid, such as a triangular grid, a pentagonal grid, a hexagonal grid, a heptagonal grid, an octagonal grid, and so forth. If the antenna array 1330 is three dimensional, the antennae 1390 may be arranged in a lattice arrangement, such as a regular or non-regular polyhedral grid, the polyhedron optionally being a cube or rectangular prism. While antennae in the antenna array 1330 may be arranged a grid or lattice or shape or some combination thereof, they need not be arranged in any of these.

FIG. 15 illustrates feature extraction, mapping, and training of a mixture of similarity functions to discover matching features or patterns. Feature extraction occurs from probe images 1505 (e.g., recently captured by radar device of FIG. 13) and enrolled images 1510 (e.g., from enrolled database). Image 1515 is an example. These may be radar images as discussed above. Color (RGB) and texture data may be obtained as well, for example from a camera, and may be combined with phase/amplitude/magnitude and depth data from the radar images. Principal component analysis (PCA) occurs at step 1520, followed by explicit polynomial-kernel feature mapping to identify and represent image pairs, specifically positive pairs 1525 of similar features or patterns and identifying negative pairs 1530 of dissimilar features or patterns. Multiple similarity functions—represented as $u_1$, $u_2$, and $u_3$ in FIG. 15—are trained to discover matching patterns, helping train further feature pairing.

Figure 16:
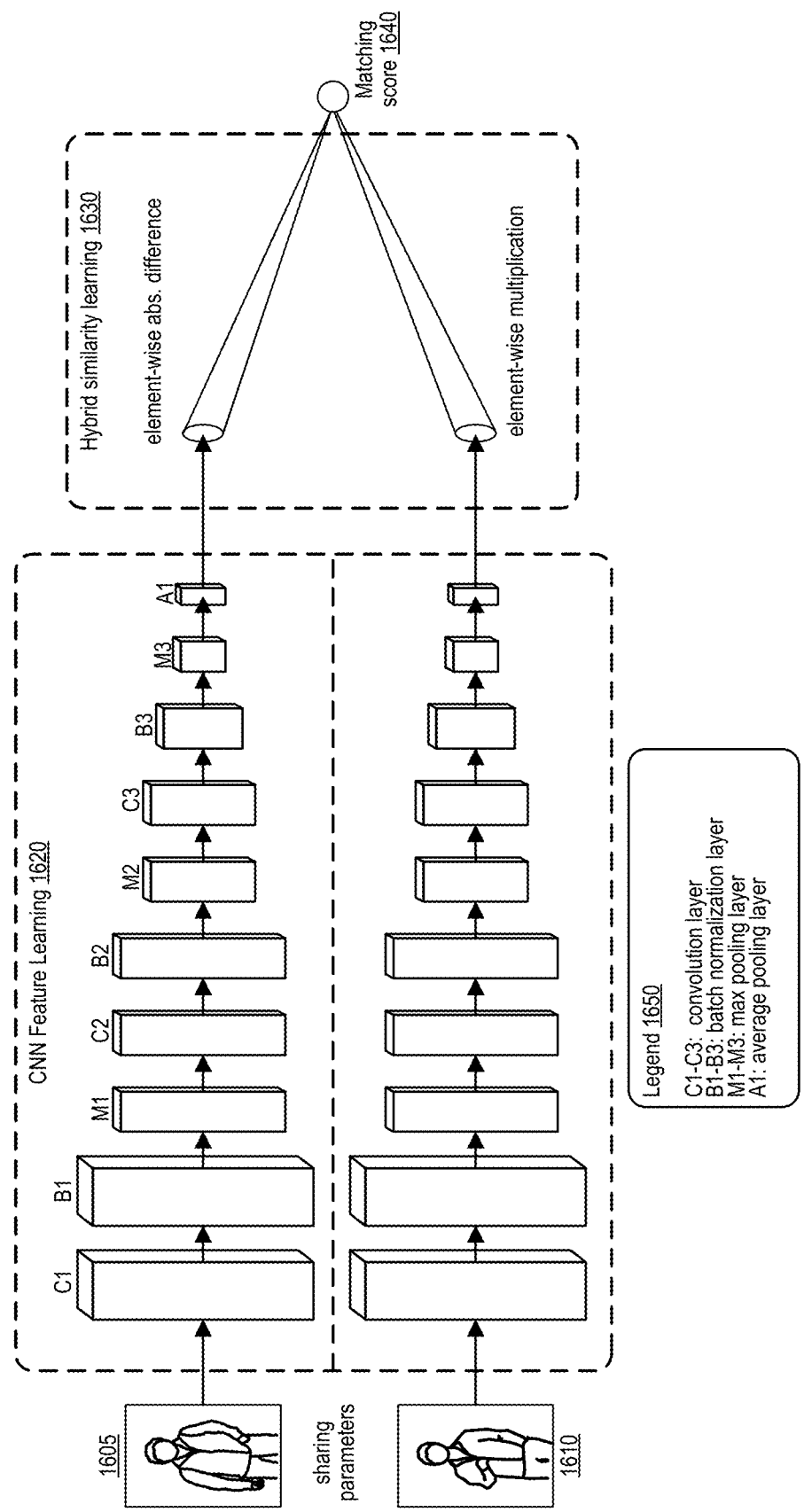
FIG. 16 illustrates a generation of a matching score via a hybrid similarity learning module utilizing a convolutional neural network (CNN) feature learning module.

FIG. 16 illustrates a generation of a matching score via a hybrid similarity learning module utilizing a convolutional neural network (CNN) feature learning module. In particular, two images 1605 and 1610 are run through the convolutional neural network (CNN) feature learning module 1620, running through convolution layers, batch normalization layers, max pooling layers, and an average pooling layer. In FIG. 16 in particular, as indicated by the legend 1650, a first convolution layer is used, then a first batch normalization layer, then a first max pooling layer, then a second convolution layer, then a second batch normalization layer, then a second max pooling layer, then a third convolution layer, then a third batch normalization layer, then a third max pooling layer, then an average pooling layer. A hybrid similarity learning module is then used to generate the matching score 1640, optionally based on element-wise absolute difference(s) and/or element-wise multiplication.

FIG. 17 illustrates an exemplary computing system 1700 that may be used to implement some aspects of the object recognition and verification technology. For example, any of the computing devices, computing systems, network devices, network systems, servers, and/or arrangements of circuitry described herein may include at least one computing system 1700, or may include at least one component of the computer system 1700 identified in FIG. 17. The computing system 1700 of FIG. 17 includes one or more processors 1710 and memory 1720. Each of the processor(s) 1710 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1710 may include one or more cores, either integrated onto a single chip or spread across multiple chips connected or coupled together. Memory 1720 stores, in part, instructions and data for execution by processor 1710. Memory 1720 can store the executable code when in operation. The system 1700 of FIG. 17 further includes a mass storage device 1730, portable storage medium drive(s) 1740, output devices 1750, user input devices 1760, a graphics display 1770, and peripheral devices 1780.

The components shown in FIG. 17 are depicted as being connected via a single bus 1790. However, the components may be connected through one or more data transport means. For example, processor unit 1710 and memory 1720 may be connected via a local microprocessor bus, and the mass storage device 1730, peripheral device(s) 1780, portable storage device 1740, and display system 1770 may be connected via one or more input/output (I/O) buses.

Mass storage device 1730, which may be implemented with a magnetic disk drive or an optical disk drive, is a non-volatile storage device for storing data and instructions for use by processor unit 1710. Mass storage device 1730 can store the system software for implementing some aspects of the object recognition and verification technology for purposes of loading that software into memory 1720.

Portable storage device 1740 operates in conjunction with a portable non-volatile storage medium, such as a floppy disk, compact disk or Digital video disc, to input and output data and code to and from the computer system 1700 of FIG. 17. The system software for implementing aspects of the object recognition and verification technology may be stored on such a portable medium and input to the computer system 1700 via the portable storage device 1740.

The memory 1720, mass storage device 1730, or portable storage 1740 may in some cases store sensitive information, such as transaction information, health information, or cryptographic keys, and may in some cases encrypt or decrypt such information with the aid of the processor 1710. The memory 1720, mass storage device 1730, or portable storage 1740 may in some cases store, at least in part, instructions, executable code, or other data for execution or processing by the processor 1710.

Output devices 1750 may include, for example, communication circuitry for outputting data through wired or wireless means, display circuitry for displaying data via a display screen, audio circuitry for outputting audio device circuitry 1750 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 1550 may include any ports, plugs, antennae, wired or wireless transmitters, wired or wireless transceivers, or any other components necessary for or usable to implement the communication types listed above, such as cellular Subscriber Identity Module (SIM) cards.

Input devices 1760 may include circuitry providing a portion of a user interface. Input devices 1760 may include an alpha-numeric keypad, such as a keyboard, for inputting alpha-numeric and other information, or a pointing device, such as a mouse, a trackball, stylus, or cursor direction keys. Input devices 1760 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 1760 may include any ports, plugs, antennae, wired or wireless receivers, wired or wireless transceivers, or any other components necessary for or usable to implement the communication types listed above, such as cellular SIM cards.

Input devices 1760 may include eless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a SONAR transceiver, a RADAR transceiver, a LIDAR transceiver, a network device, a motor, an actuator, a pump, a conveyer belt, a robotic arm, a rotor, a drill, a chemical assay device, or some combination thereof.

The components contained in the computer system 1700 of FIG. 17 can include those typically found in computer systems that may be suitable for use with some aspects of the object recognition and verification technology and represent a broad category of such computer components that are well known in the art. That said, the computer system 1700 of FIG. 17 can be customized and specialized for the purposes discussed herein and to carry out the various operations discussed herein, with specialized hardware components, specialized arrangements of hardware components, and/or specialized software. Thus, the computer system 1700 of FIG. 17 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1700 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1500 may also use a Basic Input/Output System (BIOS) or Unified Extensible Firmware Interface (UEFI) as a layer upon which the operating system(s) are run.

In some cases, the computer system 1700 may be part of a multi-computer system that uses multiple computer systems 1700, each for one or more specific tasks or purposes. For example, the multi-computer system may include multiple computer systems 1700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1700 from different networks communicatively coupled together via the internet (also known as a "distributed" system).

Some aspects of the technology may be implemented in an application that may be operable using a variety of devices. Non-transitory computer-readable storage media refer to any medium or media that participate in providing instructions to a central processing unit (CPU) for execution and that may be used in the memory 1720, the mass storage 1730, the portable storage 1740, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1710 for execution. A bus 1790 carries the data to system RAM or another memory 1720, from which a processor 1710 retrieves and executes the instructions. The instructions received by system RAM or another memory 1720 can optionally be stored on a fixed disk (mass storage device 1730/portable storage 1740) either before or after execution by processor 1710. Various forms of storage may likewise be implemented as well as the necessary network interfaces and network topologies to implement the same.

While various flow diagrams provided and described above may show a particular order of operations performed by some embodiments of the object recognition and verification technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1500 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The object verification and recognition techniques discussed herein may be implemented using compressed images and/or compressed video frames, or using uncompressed images and/or video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of performing object verification using radar images, the method comprising:
    obtaining a first radar image and a second radar image;
    extracting features from the first radar image, wherein the features extracted from the first radar image include a respective magnitude for each pixel in the first radar image, a magnitude for a pixel in the first radar image being calculated based on at least a root sum of squares of an amplitude and a phase of at least a first radio signal corresponding to the pixel in the first radar image;
    extracting features from the second radar image, wherein the features extracted from the second radar image include a respective magnitude for each pixel in the second radar image, a magnitude for a pixel in the second radar image being calculated based on at least a root sum of squares of an amplitude and a phase of at least a second radio signal corresponding to the pixel in the second radar image;
    determining distances between first respective magnitudes corresponding to the features extracted from the first radar image and second respective magnitudes corresponding to the features extracted from the second radar image;
    determining a similarity between an object represented by the first radar image and an object represented by the second radar image based on the distances between the first respective magnitudes corresponding to the features extracted from the first radar image and the second respective magnitudes corresponding to the features extracted from the second radar image; and
    determining whether the object represented by the first radar image matches the object represented by the second radar image based on the determined similarity.

2. The method of claim 1, wherein the first radar image and the second radar image are generated using radio signals from an array of antennas, wherein the radio signals include the first radio signal and the second radio signal.

3. The method of claim 2, wherein each pixel in the first radar image corresponds to at least one antenna from the array of antennas, and wherein each pixel in the second radar image corresponds to at least one antenna from the array of antennas.

4. The method of claim 1, wherein the features extracted from the first radar image include at least the amplitude and the phase for the pixel in the first radar image, and wherein the features extracted from the second radar image include at least the amplitude and the phase for the pixel in the second radar image.

5. The method of claim 1, wherein determining the distances between the first respective magnitudes corresponding to the features from the first radar image and the second respective magnitudes corresponding to the features from the second radar image includes:
    determining a first respective distance between a respective amplitude for each pixel in the first radar image and a corresponding amplitude for a corresponding pixel in the second radar image; and determining a second respective distance between a respective phase for each pixel in the first radar image and a corresponding phase for a corresponding pixel in the second radar image.

6. The method of claim 1, wherein determining the distances between the first respective magnitudes corresponding to the features from the first radar image and the second respective magnitudes corresponding to the features from the second radar image further includes:
determining a respective distance between the respective magnitude for each pixel in the first radar image and a corresponding magnitude for a corresponding pixel in the second radar image.

7. The method of claim 1, wherein at least the amplitude and the phase are extracted for each range bin of a plurality of range bins corresponding to each pixel in the first radar image, and wherein at least the amplitude and the phase are extracted for each range bin of a plurality of range bins corresponding to each pixel in the second radar image.

8. The method of claim 7, wherein the respective magnitude for each pixel in the first radar image is extracted for each range bin of the plurality of range bins corresponding to each pixel in the first radar image, and wherein the respective magnitude for each pixel in the second radar image is extracted for each range bin of the plurality of range bins corresponding to each pixel in the second radar image.

9. The method of claim 1, wherein the similarity between the object represented by the first radar image and the object represented by the second radar image is determined using a mapping function between matching labels and distances between the features from the first radar image and the features from the second radar image.

10. The method of claim 9, wherein the mapping function is determined using a support vector machine (SVM).

11. The method of claim 9, wherein the mapping function is determined using a support vector machine (SVM) and principal component analysis (PCA).

12. The method of claim 9, wherein the mapping function is determined using a Partial Least Squares Regression (PLSR).

13. The method of claim 9, wherein the mapping function is determined using a deep neural network.

14. The method of claim 1, wherein the object represented by the first radar image is determined to match the object represented by the second radar image when the determined similarity is greater than a pre-determined matching threshold.

15. The method of claim 1, wherein the object represented by the first radar image is determined not to match the object represented by the second radar image when the determined similarity is less than a pre-determined matching threshold.

16. The method of claim 1, wherein the first radar image is an input image obtained from a radar measurement device, and wherein the second radar image is an enrolled image from an enrolled database.

17. The method of claim 1, wherein the object represented by the first radar image is a first face, and wherein the object represented by the second radar image is a second face.

18. The method of claim 1, wherein determining a similarity between the object represented by the first radar image and the object represented by the second radar image is based on an output of one or more trained machine learning models in response to input of at least a portion of the distances into the one or more trained machine learning models.

19. The method of claim 1, wherein the root sum of squares of the amplitude and the phase of at least the first radio signal is an absolute value of the amplitude and the phase of at least the first radio signal, and wherein the root sum of squares of the amplitude and the phase of at least the second radio signal is an absolute value of the amplitude and the phase of at least the second radio signal.

20. An apparatus for performing object verification using radar images, comprising:
a memory configured to store one or more radar images; and
a processor configured to:
obtain a first radar image and a second radar image;
extract features from the first radar image, wherein the features extracted from the first radar image include a respective magnitude for each pixel in the first radar image, a magnitude for a pixel in the first radar image being calculated based on at least a root sum of squares of an amplitude and a phase of at least a first radio signal corresponding to the pixel in the first radar image;
extract features from the second radar image, wherein the features extracted from the second radar image include a respective magnitude for each pixel in the second radar image, a magnitude for a pixel in the second radar image being calculated based on at least a root sum of squares of an amplitude and a phase of at least a second radio signal corresponding to the pixel in the second radar image;
determine distances between first respective magnitudes corresponding to the features extracted from the first radar image and second respective magnitudes corresponding to the features extracted from the second radar image;
determine a similarity between an object represented by the first radar image and an object represented by the second radar image based on the distances between the first respective magnitudes corresponding to the features extracted from the first radar image and the second respective magnitudes corresponding to the features extracted from the second radar image; and
determine whether the object represented by the first radar image matches the object represented by the second radar image based on the determined similarity.

21. The apparatus of claim 20, wherein the first radar image and the second radar image are generated using radio signals from an array of antennas, wherein the radio signals include the first radio signal and the second radio signal.

22. The apparatus of claim 21, wherein each pixel in the first radar image corresponds to at least one antenna from the array of antennas, and wherein each pixel in the second radar image corresponds to at least one antenna from the array of antennas.

23. The apparatus of claim 20, wherein the features extracted from the first radar image include at least the amplitude and the phase for each pixel in the first radar image, and wherein the features extracted from the second radar image include at least the amplitude and the phase for each pixel in the second radar image.

24. The apparatus of claim 20, wherein determining the distances between the first respective magnitudes corresponding to the features from the first radar image and the second respective magnitudes corresponding to the features from the second radar image includes:
determining a first respective distance between a respective amplitude for each pixel in the first radar image and a corresponding amplitude for a corresponding pixel in the second radar image; and determining a second respective distance between a respective phase for each pixel in the first radar image and a corresponding phase for a corresponding pixel in the second radar image.

25. The apparatus of claim 20, wherein determining the distances between the first respective magnitudes corresponding to the features from the first radar image and the second respective magnitudes corresponding to the features from the second radar image further includes:

determining a respective distance between the respective magnitude for each pixel in the first radar image and a corresponding magnitude for a corresponding pixel in the second radar image.

26. The apparatus of claim 20, wherein at least the amplitude and the phase are extracted for each range bin of a plurality of range bins corresponding to each pixel in the first radar image, and wherein at least the amplitude and the phase are extracted for each range bin of a plurality of range bins corresponding to each pixel in the second radar image.

27. The apparatus of claim 26, wherein the respective magnitude for each pixel in the first radar image is extracted for each range bin of the plurality of range bins corresponding to each pixel in the first radar image, and wherein the respective magnitude for each pixel in the second radar image is extracted for each range bin of the plurality of range bins corresponding to each pixel in the second radar image.

28. The apparatus of claim 20, wherein the similarity between the object represented by the first radar image and the object represented by the second radar image is determined using a mapping function between matching labels and distances between the features from the first radar image and the features from the second radar image.

29. The apparatus of claim 20, wherein determining a similarity between the object represented by the first radar image and the object represented by the second radar image is based on an output of one or more trained machine learning models in response to input of at least a portion of the distances into the one or more trained machine learning models.

30. The apparatus of claim 20, wherein the root sum of squares of the amplitude and the phase of at least the first radio signal is an absolute value of the amplitude and the phase of at least the first radio signal, and wherein the root sum of squares of the amplitude and the phase of at least the second radio signal is an absolute value of the amplitude and the phase of at least the second radio signal.

\* \* \* \* \*